United States Patent
Tanaka et al.

(10) Patent No.: US 7,640,407 B2
(45) Date of Patent: Dec. 29, 2009

(54) DATA MIGRATION METHOD

(75) Inventors: Toru Tanaka, Kawasaki (JP); Yuichi Taguchi, Sagamihara (JP); Fumi Miyazaki, Kawasaki (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 12/112,198

(22) Filed: Apr. 30, 2008

(65) Prior Publication Data

US 2008/0209104 A1 Aug. 28, 2008

Related U.S. Application Data

(63) Continuation of application No. 11/264,238, filed on Oct. 31, 2005, now Pat. No. 7,373,469.

(30) Foreign Application Priority Data

Aug. 26, 2005 (JP) ............................... 2005-245540

(51) Int. Cl.
*G06F 12/16* (2006.01)
*G06F 13/00* (2006.01)

(52) U.S. Cl. .................. 711/161; 711/162; 711/165; 709/214; 709/218

(58) Field of Classification Search .................. None
See application file for complete search history.

(56) References Cited

U.S. PATENT DOCUMENTS

| 5,893,139 | A | 4/1999 | Kamiyama | |
|---|---|---|---|---|
| 7,085,883 | B1* | 8/2006 | Dalgic et al. | 711/114 |
| 2002/0103969 | A1 | 8/2002 | Koizumi | |
| 2003/0221060 | A1 | 11/2003 | Umberger | |
| 2005/0055402 | A1 | 3/2005 | Sato | |
| 2006/0112247 | A1* | 5/2006 | Ramany et al. | 711/165 |
| 2006/0129654 | A1 | 6/2006 | Sato | |

FOREIGN PATENT DOCUMENTS

| JP | 2004-005370 | 1/2004 |
|---|---|---|
| WO | WO97/09676 | 3/1997 |

* cited by examiner

*Primary Examiner*—Than Nguyen
(74) *Attorney, Agent, or Firm*—Townsend and Townsend and Crew LLP

(57) ABSTRACT

A first storage system includes a first storage area for storing data written by a computer. A second storage system includes a second storage area to which the data stored in the first storage area migrates. A third storage system includes a virtual storage area corresponding to the second storage area. An access request to the virtual storage area is converted into an access request to the second storage area to be issued. A management computer transmits, to the third storage system, an instruction to migrate the data of the second storage area to a third storage area of the third storage system based on a determination result between a value of the data migrated to the second storage area and a predetermined threshold value.

21 Claims, 23 Drawing Sheets

FIG.3A

| APPLICATION PROGRAM NUMBER (511) | CONNECTION DESTINATION STORAGE AREA NUMBER (512) | | | | 51 |
|---|---|---|---|---|---|
| | 1ST PATH | 2ND PATH | ... | n-TH PATH | |
| 15 | 101 | 211 | ... | | |
| 16 | 102 | 212 | ... | | |

FIG.3B

| APPLICATION PROGRAM NUMBER (511) | CONNECTION DESTINATION STORAGE AREA NUMBER (512) | | | | 51 |
|---|---|---|---|---|---|
| | 1ST PATH | 2ND PATH | ... | n-TH PATH | |
| 15 | 211 | 201 | ... | | |
| 16 | 212 | | ... | | |

FIG.3C

| APPLICATION PROGRAM NUMBER (511) | CONNECTION DESTINATION STORAGE AREA NUMBER (512) | | | | 51 |
|---|---|---|---|---|---|
| | 1ST PATH | 2ND PATH | ... | n-TH PATH | |
| 15 | 201 | | ... | | |
| 16 | 212 | | ... | | |

FIG.3D

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 101 | 201 | ... | |
| 16 | 102 | 202 | | |

FIG.3E

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 201 | | ... | |
| 16 | 202 | 212 | | |

FIG.3F

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 201 | | ... | |
| 16 | 212 | | | |

FIG.3G

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 101 | 201 | | |
| 16 | 102 | 212 | | |
| 17 | 103 | 213 | | |
| 18 | 104 | 214 | | |

FIG.3H

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 201 | | | |
| 16 | 212 | 202 | | |
| 17 | 213 | | | |
| 18 | 214 | | | |

FIG.3I

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 201 | | | |
| 16 | 202 | | | |
| 17 | 213 | | | |
| 18 | 214 | | | |

FIG.3J

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 101 | 201 | | |
| 16 | 102 | 202 | | |
| 17 | 103 | 203 | | |
| 18 | 104 | 214 | | |

FIG.3K

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 201 | | | |
| 16 | 202 | | | |
| 17 | 203 | 213 | | |
| 18 | 214 | | | |

FIG.3L

| APPLICATION PROGRAM NUMBER | CONNECTION DESTINATION STORAGE AREA NUMBER | | | |
|---|---|---|---|---|
| | 1ST PATH | 2ND PATH | ... | n-TH PATH |
| 15 | 201 | | | |
| 16 | 202 | | | |
| 17 | 213 | | | |
| 18 | 214 | | | |

FIG.4A

| STORAGE AREA NUMBER *1561* | CAPACITY *1562* |
|---|---|
| 101 | 100 GB |
| 102 | 100 GB |
| ⋮ | |
| | |

FIG.4B

| STORAGE AREA NUMBER *1561* | CAPACITY *1562* |
|---|---|
| 101 | 100 GB |
| 102 | 100 GB |
| 103 | 100 GB |
| 104 | 100 GB |
| ⋮ | |
| | |

FIG.5A

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 101 | | 301 |
| 102 | | 302 |
| ⋮ | | |
| | | |

FIG.5B

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 101 | 111 | 301 |
| 102 | 112 | 302 |
| ⋮ | | |
| | | |

FIG.5C

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 301 | | 201 |
| ⋮ | | |
| | | |

FIG.5D

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 301 | 211 | 201 |
| ⋮ | | |
| | | |

FIG.5E

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 101 | | 201 |
| 102 | | 202 |
| ⋮ | | |

FIG.5F

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 101 | 111 | 201 |
| 102 | 112 | 202 |
| ⋮ | | |

FIG.5G

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 202 | | 302 |
| ⋮ | | |

FIG.5H

| DATA MIGRATION SOURCE STORAGE AREA NUMBER | VIRTUAL STORAGE AREA NUMBER | DATA MIGRATION DESTINATION STORAGE AREA NUMBER |
|---|---|---|
| 202 | 212 | 302 |
| ⋮ | | |

*FIG.5I*

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 | 556 |
|---|---|---|---|
| 101 | | 201 | |
| 102 | | 302 | |
| 103 | | 303 | |
| 104 | | 304 | |
| | ⋮ | | |
| | | | |

*FIG.5J*

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 | 556 |
|---|---|---|---|
| 101 | 111 | 201 | |
| 102 | 112 | 302 | |
| 103 | 113 | 303 | |
| 104 | 114 | 304 | |
| | ⋮ | | |
| | | | |

*FIG.5K*

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 | 556 |
|---|---|---|---|
| 302 | | 202 | |
| | ⋮ | | |
| | | | |

*FIG.5L*

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 | 556 |
|---|---|---|---|
| 302 | 212 | 202 | |
| | ⋮ | | |
| | | | |

FIG.5M

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 |
|---|---|---|
| 101 |  | 201 |
| 102 |  | 202 |
| 103 |  | 203 |
| 104 |  | 304 |
| ⋮ | ⋮ | ⋮ |
|  |  |  |

FIG.5N

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 |
|---|---|---|
| 101 | 111 | 201 |
| 102 | 112 | 202 |
| 103 | 113 | 203 |
| 104 | 114 | 304 |
| ⋮ | ⋮ | ⋮ |
|  |  |  |

FIG.5O

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 |
|---|---|---|
| 203 |  | 303 |
| ⋮ | ⋮ | ⋮ |
|  |  |  |

FIG.5P

| DATA MIGRATION SOURCE STORAGE AREA NUMBER 5561 | VIRTUAL STORAGE AREA NUMBER 5562 | DATA MIGRATION DESTINATION STORAGE AREA NUMBER 5563 |
|---|---|---|
| 203 | 213 | 303 |
| ⋮ | ⋮ | ⋮ |
|  |  |  |

FIG.6A

| COPY SOURCE STORAGE AREA NUMBER 1551 | COPY DESTINATION STORAGE AREA NUMBER 1552 | STATUS 1553 | 155 |
|---|---|---|---|
| 101 | 111 | PAIR | |
| 102 | 112 | PAIR | |
| | : | | |
| | | | |

FIG.6B

| COPY SOURCE STORAGE AREA NUMBER 1551 | COPY DESTINATION STORAGE AREA NUMBER 1552 | STATUS 1553 | 155 |
|---|---|---|---|
| 101 | 111 | BEING COPIED | |
| 102 | 112 | BEING COPIED | |
| | : | | |
| | | | |

FIG.6C

| COPY SOURCE STORAGE AREA NUMBER 1551 | COPY DESTINATION STORAGE AREA NUMBER 1552 | STATUS 1553 | 155 |
|---|---|---|---|
| 211 | 201 | PAIR | |
| | : | | |
| | | | |

FIG.6D

| COPY SOURCE STORAGE AREA NUMBER 1551 | COPY DESTINATION STORAGE AREA NUMBER 1552 | STATUS 1553 | 155 |
|---|---|---|---|
| 211 | 201 | BEING COPIED | |
| | : | | |
| | | | |

FIG.6E

| COPY SOURCE STORAGE AREA NUMBER 1551 | COPY DESTINATION STORAGE AREA NUMBER 1552 | STATUS 1553 |
|---|---|---|
| 101 | 111 | PAIR |
| 102 | 112 | PAIR |
| ⋮ | | |
| | | |

| COPY SOURCE STORAGE AREA NUMBER 1551 | COPY DESTINATION STORAGE AREA NUMBER 1552 | STATUS 1553 |
|---|---|---|
| 101 | 111 | BEING COPIED |
| 102 | 112 | BEING COPIED |
| ⋮ | | |
| | | |

| COPY SOURCE STORAGE AREA NUMBER 1551 | COPY DESTINATION STORAGE AREA NUMBER 1552 | STATUS 1553 |
|---|---|---|
| 202 | 212 | PAIR |
| ⋮ | | |
| | | |

| COPY SOURCE STORAGE AREA NUMBER 1551 | COPY DESTINATION STORAGE AREA NUMBER 1552 | STATUS 1553 |
|---|---|---|
| 202 | 212 | BEING COPIED |
| ⋮ | | |
| | | |

| COPY SOURCE STORAGE AREA NUMBER (1551) | COPY DESTINATION STORAGE AREA NUMBER (1552) | STATUS (1553) |
|---|---|---|
| 101 | 111 | PAIR |
| 102 | 112 | PAIR |
| 103 | 113 | PAIR |
| 104 | 114 | PAIR |
| ⋮ | | |
| | | |

| COPY SOURCE STORAGE AREA NUMBER (1551) | COPY DESTINATION STORAGE AREA NUMBER (1552) | STATUS (1553) |
|---|---|---|
| 101 | 111 | BEING COPIED |
| 102 | 112 | BEING COPIED |
| 103 | 113 | BEING COPIED |
| 104 | 114 | BEING COPIED |
| ⋮ | | |
| | | |

| COPY SOURCE STORAGE AREA NUMBER (1551) | COPY DESTINATION STORAGE AREA NUMBER (1552) | STATUS (1553) |
|---|---|---|
| 212 | 202 | PAIR |
| ⋮ | | |
| | | |

| COPY SOURCE STORAGE AREA NUMBER (1551) | COPY DESTINATION STORAGE AREA NUMBER (1552) | STATUS (1553) |
|---|---|---|
| 212 | 202 | BEING COPIED |
| ⋮ | | |
| | | |

| COPY SOURCE STORAGE AREA NUMBER 1551 | COPY DESTINATION STORAGE AREA NUMBER 1552 | STATUS 1553 | 155 |
|---|---|---|---|
| 101 | 111 | PAIR | |
| 102 | 112 | PAIR | |
| 103 | 113 | PAIR | |
| 104 | 114 | PAIR | |
| : | : | : | |
| | | | |

FIG.6N

| COPY SOURCE STORAGE AREA NUMBER 1551 | COPY DESTINATION STORAGE AREA NUMBER 1552 | STATUS 1553 | 155 |
|---|---|---|---|
| 101 | 111 | BEING COPIED | |
| 102 | 112 | BEING COPIED | |
| 103 | 113 | BEING COPIED | |
| 104 | 114 | BEING COPIED | |
| : | : | : | |
| | | | |

FIG.6O

| COPY SOURCE STORAGE AREA NUMBER 1551 | COPY DESTINATION STORAGE AREA NUMBER 1552 | STATUS 1553 | 155 |
|---|---|---|---|
| 203 | 213 | PAIR | |
| : | : | : | |
| | | | |

FIG.6P

| COPY SOURCE STORAGE AREA NUMBER 1551 | COPY DESTINATION STORAGE AREA NUMBER 1552 | STATUS 1553 | 155 |
|---|---|---|---|
| 203 | 213 | BEING COPIED | |
| : | : | : | |
| | | | |

DATA MIGRATION METHOD

CROSS-REFERENCE TO RELATED APPLICATION(S)

The is a continuation application of U.S. application Ser. No. 11/264,238 filed Oct. 31, 2005, which claims priority from Japanese application JP2005-245540 filed on Aug. 26, 2005, the content of both of which are hereby fully incorporated by reference into this application for all purposes.

BACKGROUND

This invention relates to a computer system including a plurality of storage systems and computers, and more particularly to data migration in a virtualized environment, where a storage system is virtualized.

Computers store data in the storage system. When a retention period of the data is longer than the life of the storage system, it is required to migrate the data stored in an old storage system to a new storage system before the device reaches its life. Upon the data migration, an unavailable time period is desirably as short as possible, in which the computer cannot use the storage system, and furthermore, migration is desirably conducted without any stop.

Exemplary technologies of migrating data from an old storage system to a new storage system are disclosed in JP 2004-5370 A and WO97/09676. According to JP 2004-5370 A, a computer can access data in the old storage system via the new storage system. According to WO97/09676, when data requested to be read by a computer is not present in the new storage system, the data is preferentially copied from the old storage system to the new storage system. Thus, according to JP 2004-5370 A and WO97/09676, even before the data is copied from the old storage system to the new storage system, the computer can be disconnected from the old storage system to be connected to the new storage system.

SUMMARY

When the new storage system is introduced, a plurality of storage systems may be added. For example, to suppress introduction costs, a high-performance and small-capacity storage system (upper storage system) and a non-high performance large-capacity inexpensive storage system (lower storage system) may be introduced.

In this example, preferably, data of a high access frequency is migrated to the high-performance upper storage system, while data of a low access frequency is migrated to the inexpensive lower storage system. In such a case, when the technology described in JP 2004-5370 A or WO97/09676 is applied, a data migration destination must be decided before data migration is started. When there are a plurality of storage areas (logical volumes) in the old storage system, which of the upper and lower storage systems the data is to be migrated to must be decided for all the storage areas.

Furthermore, according to the technologies described in JP 2004-5370 A and WO97/09676, an I/O generated to copy the data from the old storage system to the new storage system, and an application I/O generated to enable the computer to use the new storage system pass through the same path. Thus, the application load of the system increases.

According to the present invention, there is provided a computer system including: a computer which has an interface, a processor and a memory; a plurality of storage systems each of which has an interface, a processor and a memory; and a management computer for managing the computer and the plurality of storage systems, which has an interface, a processor and a memory, characterized in that: the plurality of storage systems include a first storage system, a second storage system, and a third storage system; the first storage system is coupled to the computer and the second storage system, and includes a first storage area for storing data written by the computer; the second storage system is coupled to the first storage system and the third storage system, and includes a second storage area to which the data stored in the first storage area migrates; the third storage system is coupled to the computer and the second storage system, includes a virtual storage area corresponding to the second storage area, converts an access request to the virtual storage area into an access request to the second storage area, and issues the converted access request to the second storage system; and the management computer transmits, the third storage system, a migration instruction to migrate the data migrated to the second storage area to a third storage area created in the third storage system to based on a determination result between a value of the data migrated to the second storage area and a predetermined threshold value.

According to an embodiment of this invention, it is not necessary to decide whether the data is to be migrated to the upper or lower storage systems before the data migration starts, but it can be decided by referring to an index, e.g. an access frequency, after the data migration. Thus, the data is optimally arranged.

Moreover, during the data migration, a path of an I/O used for copying the data and a path for an application I/O from the computer can be separated from each other. Thus, it is possible to reduce an application load.

BRIEF DESCRIPTION OF THE DRAWINGS

FIG. 3A is an explanatory diagram of path information according to the first embodiment.

FIG. 3B is an explanatory diagram of path information according to the first embodiment.

FIG. 3C is an explanatory diagram of path information according to the first embodiment.

FIG. 3D is an explanatory diagram of path information according to the first embodiment.

FIG. 3E is an explanatory diagram of path information according to the first embodiment.

FIG. 3F is an explanatory diagram of path information according to the first embodiment.

FIG. 3G is an explanatory diagram of path information according to the first embodiment.

FIG. 3H is an explanatory diagram of path information according to the first embodiment.

FIG. 3I is an explanatory diagram of path information according to the first embodiment.

FIG. 3J is an explanatory diagram of path information according to the first embodiment.

FIG. 3K is an explanatory diagram of path information according to the first embodiment.

FIG. 3L is an explanatory diagram of path information according to the first embodiment.

FIG. 4A is an explanatory diagram of a storage area list according to the first embodiment.

FIG. 4B is an explanatory diagram of a storage area list according to the first embodiment.

FIG. 5A is an explanatory diagram of a management table stored in a management computer according to the first embodiment.

FIG. 5B is an explanatory diagram of a management table stored in a management computer according to the first embodiment.

FIG. 5C is an explanatory diagram of a management table stored in a management computer according to the first embodiment.

FIG. 5D is an explanatory diagram of a management table stored in a management computer according to the first embodiment.

FIG. 5E is an explanatory diagram of a management table stored in a management computer according to the first embodiment.

FIG. 5F is an explanatory diagram of a management table stored in a management computer according to the first embodiment.

FIG. 5G is an explanatory diagram of a management table stored in a management computer according to the first embodiment.

FIG. 5H is an explanatory diagram of a management table stored in a management computer according to the first embodiment.

FIG. 5I is an explanatory diagram of a management table stored in a management computer according to the first embodiment.

FIG. 5J is an explanatory diagram of a management table stored in a management computer according to the first embodiment.

FIG. 5K is an explanatory diagram of a management table stored in a management computer according to the first embodiment.

FIG. 5L is an explanatory diagram of a management table stored in a management computer according to the first embodiment.

FIG. 5M is an explanatory diagram of a management table stored in a management computer according to the first embodiment.

FIG. 5N is an explanatory diagram of a management table stored in a management computer according to the first embodiment.

FIG. 5O is an explanatory diagram of a management table stored in a management computer according to the first embodiment.

FIG. 5P is an explanatory diagram of a management table stored in a management computer according to the first embodiment.

FIG. 6A is an explanatory diagram of a management table stored in a storage system according to the first embodiment.

FIG. 6B is an explanatory diagram of a management table stored in a storage system according to the first embodiment.

FIG. 6C is an explanatory diagram of a management table stored in a storage system according to the first embodiment.

FIG. 6D is an explanatory diagram of a management table stored in a storage system according to the first embodiment.

FIG. 6E is an explanatory diagram of a management table stored in a storage system according to the first embodiment.

FIG. 6F is an explanatory diagram of a management table stored in a storage system according to the first embodiment.

FIG. 6G is an explanatory diagram of a management table stored in a storage system according to the first embodiment.

FIG. 6H is an explanatory diagram of a management table stored in a storage system according to the first embodiment.

FIG. 6I is an explanatory diagram of a management table stored in a storage system according to the first embodiment.

FIG. 6J is an explanatory diagram of a management table stored in a storage system according to the first embodiment.

FIG. 6K is an explanatory diagram of a management table stored in a storage system according to the first embodiment.

FIG. 6L is an explanatory diagram of a management table stored in a storage system according to the first embodiment.

FIG. 6M is an explanatory diagram of a management table stored in a storage system according to the first embodiment.

FIG. 6N is an explanatory diagram of a management table stored in a storage system according to the first embodiment.

FIG. 6O is an explanatory diagram of a management table stored in a storage system according to the first embodiment.

FIG. 6P is an explanatory diagram of a management table stored in a storage system according to the first embodiment.

DESCRIPTION OF THE PREFERRED EMBODIMENT

The preferred embodiment of this invention will be described below with reference to the accompanying drawings.

FIGS. 1A to 1D are explanatory diagrams of an outline of a first embodiment.

A hardware configuration of a computer system of the embodiment will be described later with reference to FIG. 2A and the like.

Figure 1A:
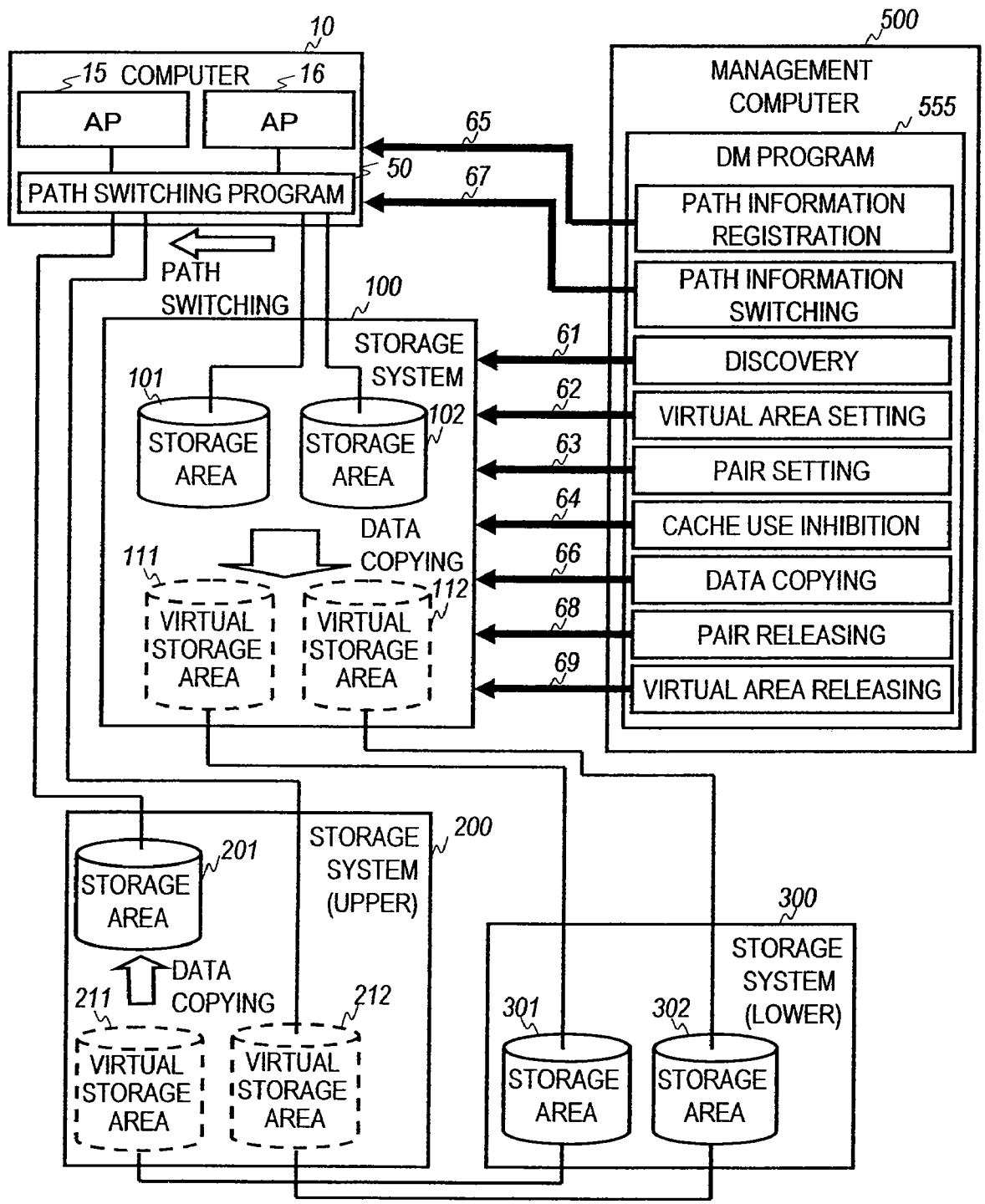
FIG. 1A is an explanatory diagram of an outline of a first embodiment.

As shown in FIG. 1A, the computer system of the embodiment includes a computer 10, a storage system 100, a storage system 200, a storage system 300, and a management computer 500.

The computer 10 is first connected to the storage system 100. Application programs (AP) 15 and 16 on the computer 10 respectively use storage areas 101 and 102 of the storage system 100. In other words, the application programs 15 and 16 respectively write data in the storage areas 101 and 102 and read the written data.

Each storage area 101 or the like is a logical area (i.e., logical volume) recognized as a single storage device by an operating system (not shown) of the computer 10.

The computer 10 holds a path switching program 50. The path switching program 50 is a program for switching a storage area for a target of a data read write request issued by the application programs 15 and 16. Herein, a path is a route of the read write request which extends from the computer 10 to any storage area. The path switching program 50 sets a target storage area of the read write request by setting path information (to be described later). The path switching program 50 according to this embodiment is initially set in a manner that the application programs 15 and 16 respectively issue a request to the storage areas 101 and 102.

The storage system 100 is an old storage system approaching to its end of life. On the other hand, the storage systems 200 and 300 are new storage systems to replace the storage system 100.

Figure 2A:
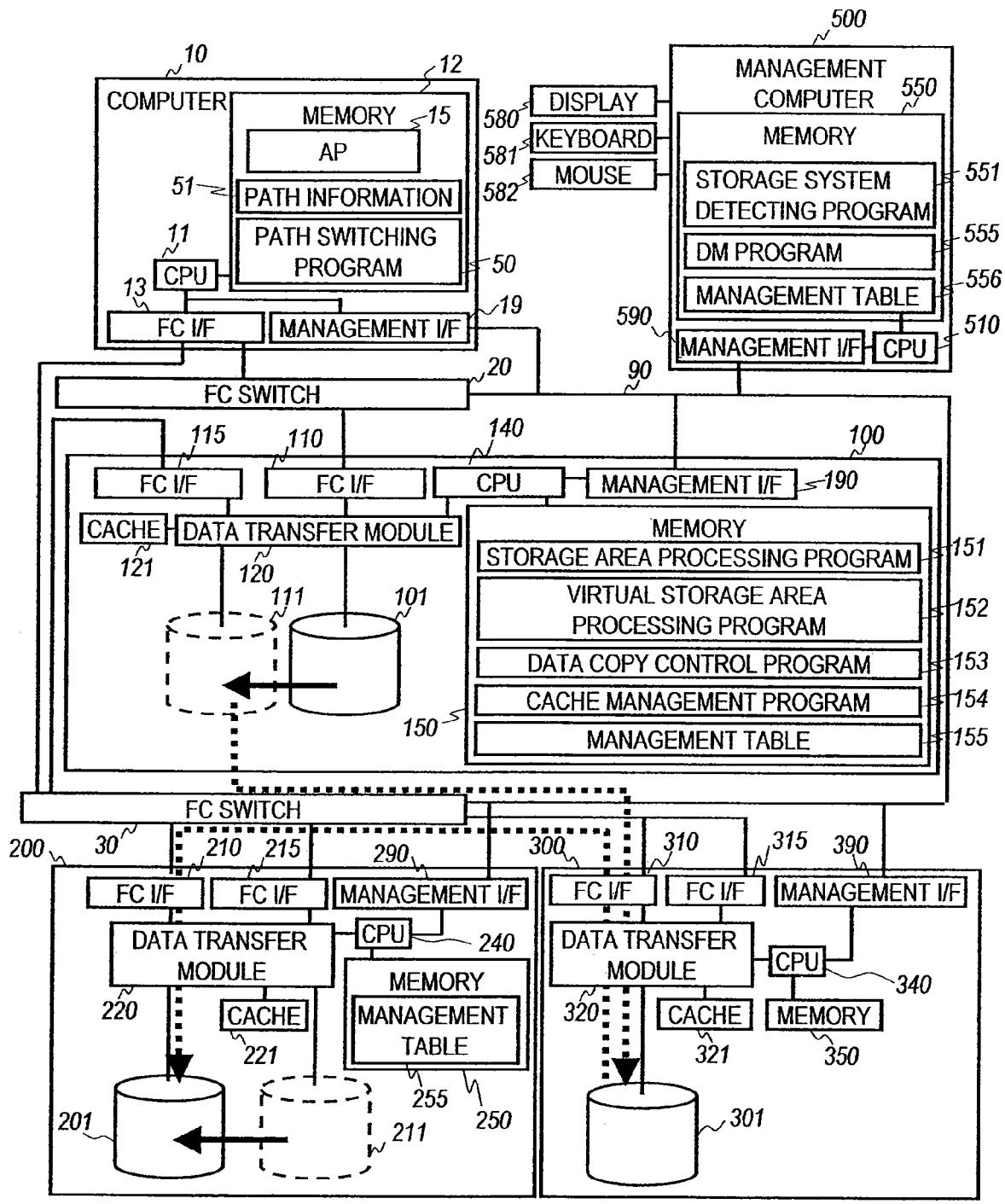
FIG. 2A is a block diagram illustrating a hardware configuration of a computer system and an example of a procedure for data migration according to the first embodiment.

In an example of FIG. 1A, the storage system 100 is connected to the computer 10 and the storage system 300 via an FC switch shown in FIG. 2A or the like. The storage system 300 is connected to the storage systems 100 and 200 via an FC switch. The storage system 200 is connected to the computer 10 and the storage system 300 via the FC switch. The computer 10 can directly access a storage area 201 or the like of the storage system 200 (upper storage system). On the other hand, the computer 10 can access a storage area 301 or the like of the storage system 300 (lower storage system) by accessing a virtual storage area 211 or the like of the storage system 300.

For example, the storage system 200 may be a high-performance storage system, and the storage system 300 may be a storage system which is not high performance but large-capacity and inexpensive.

Before the storage system 100 reaches its end of life, data stored in the old storage system is migrated to the storage system 200 or 300. In the example of FIG. 1A, data of the storage areas 101 and 102 are migrated to the storage areas 301 and 302 of the lower storage system 300. This data migration is carried out by executing a data migration program (DM program) 555 by a management computer 500. The management computer 500 manages an operation of the computer system of the embodiment.

The DM program 555 first gives the storage system 100 an instruction to make a discovery of the storage area of the storage system 300 (61).

Then, the DM program 555 gives the storage system 100 an instruction to set the discovered storage areas 301 and 302 as virtual storage areas 111 and 112 of the storage system 100 (62). As a result, the virtual storage areas 111 and 112 related to the storage areas 301 and 302 are created in the storage system 100. The virtual storage area 111 and the like are virtual areas which are related to the storage area 301 and the like where data are actually stored. In other words, data are not stored in the virtual storage area 111 and the like themselves. When a data write request is issued to the virtual storage area 111, for example, requested data are actually stored in the storage area 301 related to the virtual storage area 111.

Further, the DM program 555 instructs the storage system 200 to create virtual storage areas 211 and 212 corresponding to the storage areas 301 and 302. These virtual storage areas 211 and 212 are virtual areas as in the case of the virtual storage areas 111 and 112 as described later.

Next, the DM program 555 instructs the storage system 100 to set the storage area 101 and the virtual storage area 111 as a pair, and the storage area 102 and the virtual storage area 112 as a pair (63). The pair is a set of two storage areas where data copying is executed. One of the storage areas is a copy source, and the other is a copy destination. In the example of FIG. 1A, the storage areas 101 and 102 are copy sources, and the virtual storage areas 111 and 112 are copy destinations. When copying is executed in these pairs, data stored in the storage areas 101 and 102 are copied in the virtual storage areas 111 and 112. In actuality, the data are respectively stored in the storage areas 301 and 302.

Next, the DM program 555 gives the storage system 100 an instruction to prohibit the use of the cache 121 (see FIG. 2A etc.) with regard to the storage area 101 and 102 of the storage system 100 (64).

Next, the DM program 555 registers numbers (identifiers) of storage areas to become connection destinations after path switching in path information 51 of the path switching program 50 shown in FIG. 2A or the like (65). In the example of FIG. 1A, storage area numbers "211" and "212" of the virtual storage areas 211 and 212 are registered as "second paths" shown in FIG. 3A.

Then, the DM program 555 gives the storage system 100 an instruction to copy the data in the storage areas 101 and 102 to the virtual storage areas 111 and 102, respectively (66). As a result, the data in the storage areas 101 and 102 are respectively migrated to and stored in the storage areas 301 and 302. The process of the data migration will be described in detail later (see FIG. 2A etc.).

Upon completion of the copying, the DM program 555 instructs the path switching program 50 of the computer 10 to switch paths. The path switching program 50 sets path information 51, and switches paths so that requests from the application programs 15 and 16 can be issued to the virtual storage areas 211 and 212 (67). That is, paths set between the computer 10 and the storage area 101 and between the compute 10 and the storage area 102 are released. Then, paths are newly set between the computer 10 and the virtual storage area 211 and between the computer 10 and the virtual storage area 212.

After the completion of the switching, the DM program 555 releases the pair configuration between the storage areas 101 and 102 and the virtual storage areas 111 and 112 (68), and further releases the correspondence of the storage areas 301 and 302 to the virtual storage areas 111 and 112 (69).

At this time, the application programs 15 and 16 of the computer 10 can access the storage areas 301 and 302 of the lower storage system 300 by issuing read/write requests (i.e., access requests) to the virtual storage areas 211 and 212 of the upper storage system 200. The access procedure will be described later in detail with reference to FIG. 2A or the like.

Subsequently, a value of data of the virtual storage area 211 (i.e., value of data stored in the storage area 301 corresponding to the virtual storage area 211) is evaluated. Specifically, when the value of the data of the virtual storage area 211 exceeds a predetermined threshold, the DM program 555 instructs the storage system 200 to create a storage area 201 and to copy the data of the virtual storage area 211 in the storage area 201. As a result, the data of the storage area 301 migrates to the storage area 201 to be stored. Subsequently, the application program 15 issues a read/write request to the storage area 201.

According to the embodiment, various indexes can be evaluated as data values. For example, a use frequency of the virtual storage area 211 (i.e., use frequency of the storage area 301) may be evaluated as a data value. For example, the use frequency is the number of times of issuing access requests during a predetermined time period to the virtual storage area 211 by the computer 10.

Description of the embodiment will be made below by taking an example of evaluating a use frequency as a data value. According to the embodiment, however, optional indexes other than the use frequency, e.g., data access patterns, may be evaluated. The data access patterns are the numbers of times of issuing write access requests (number of write access times) and read access requests (number of read access times) during a predetermined time period to the virtual storage areas 211 by the computer 10.

In this case, a threshold value may be set for each of the numbers of write and read access times, and such threshold values may be different. For example, when different threshold values of the numbers of write and read access times are compared with the numbers of write and read access times respectively, and both of the numbers of access times exceed the threshold values, the data of the virtual storage area 211 may be instructed to be copied in the storage area 201. Alternatively, when at least one of the numbers of write and read access times exceeds the threshold value, the data of the virtual storage area 211 may be instructed to be copied in the storage area 201. These hold true in description below.

With the above processing, data migration from the storage area 101 or the like to the storage area 301 or the like can be executed without any interruption with the reception of the requests from the computer 10. Moreover, data of a storage area of a high use frequency alone is copied to the upper storage system 200. Thus, it is possible to realize high-speed processing while suppressing a cost increase.

Figure 1B:
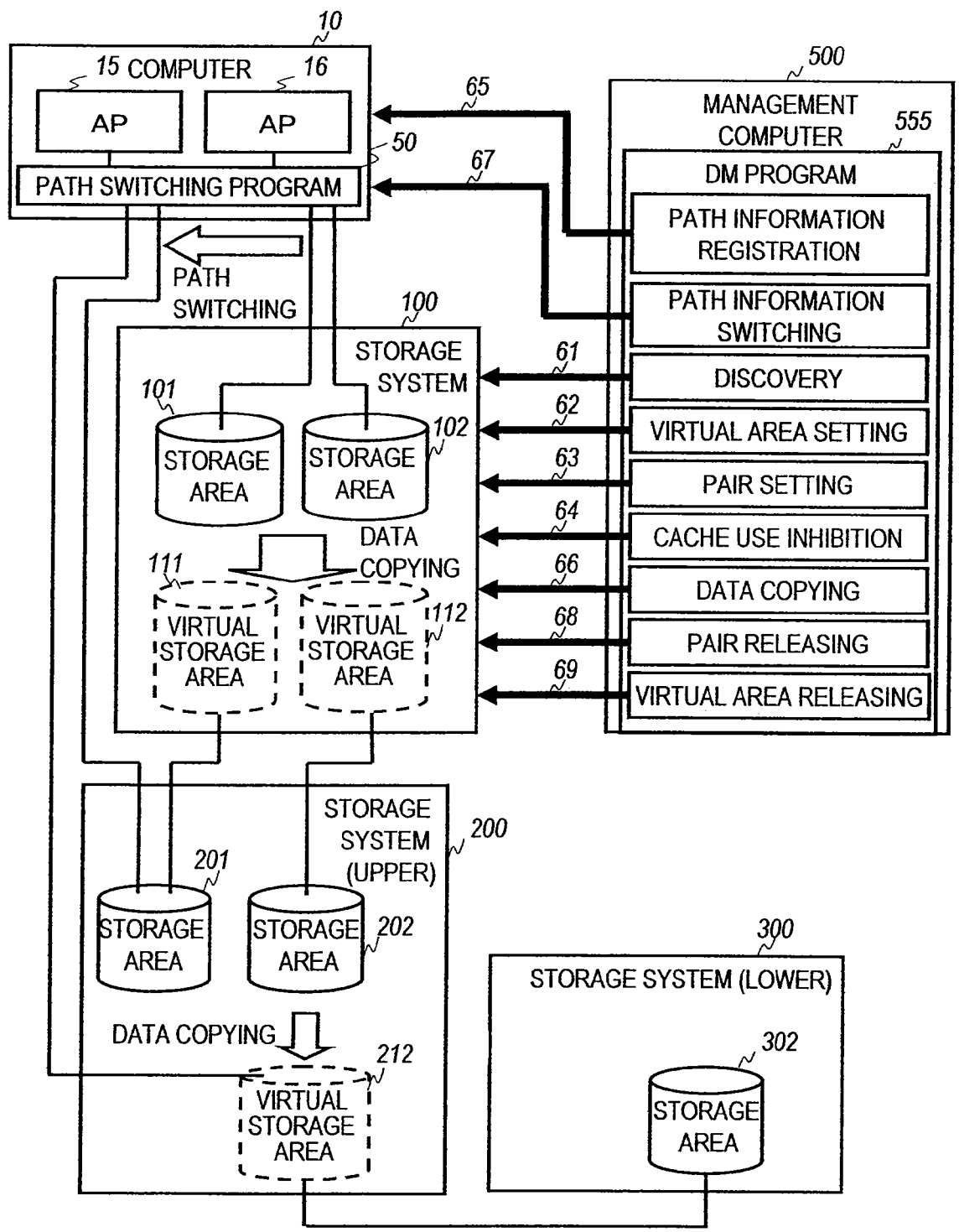
FIG. 1B is an explanatory diagram of an outline of the first embodiment.
Figure 1C:
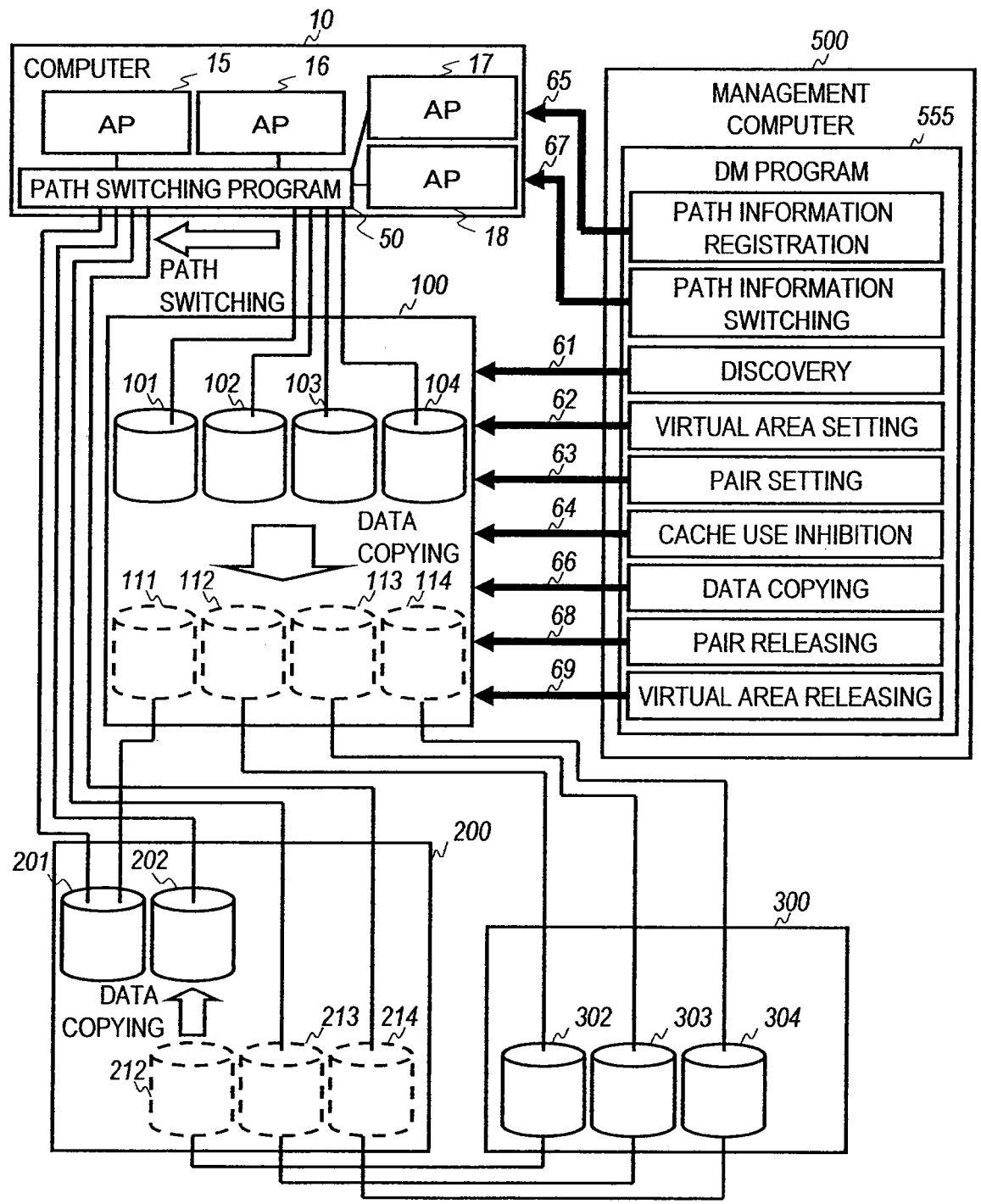
FIG. 1C is an explanatory diagram of an outline of the first embodiment.
Figure 1D:
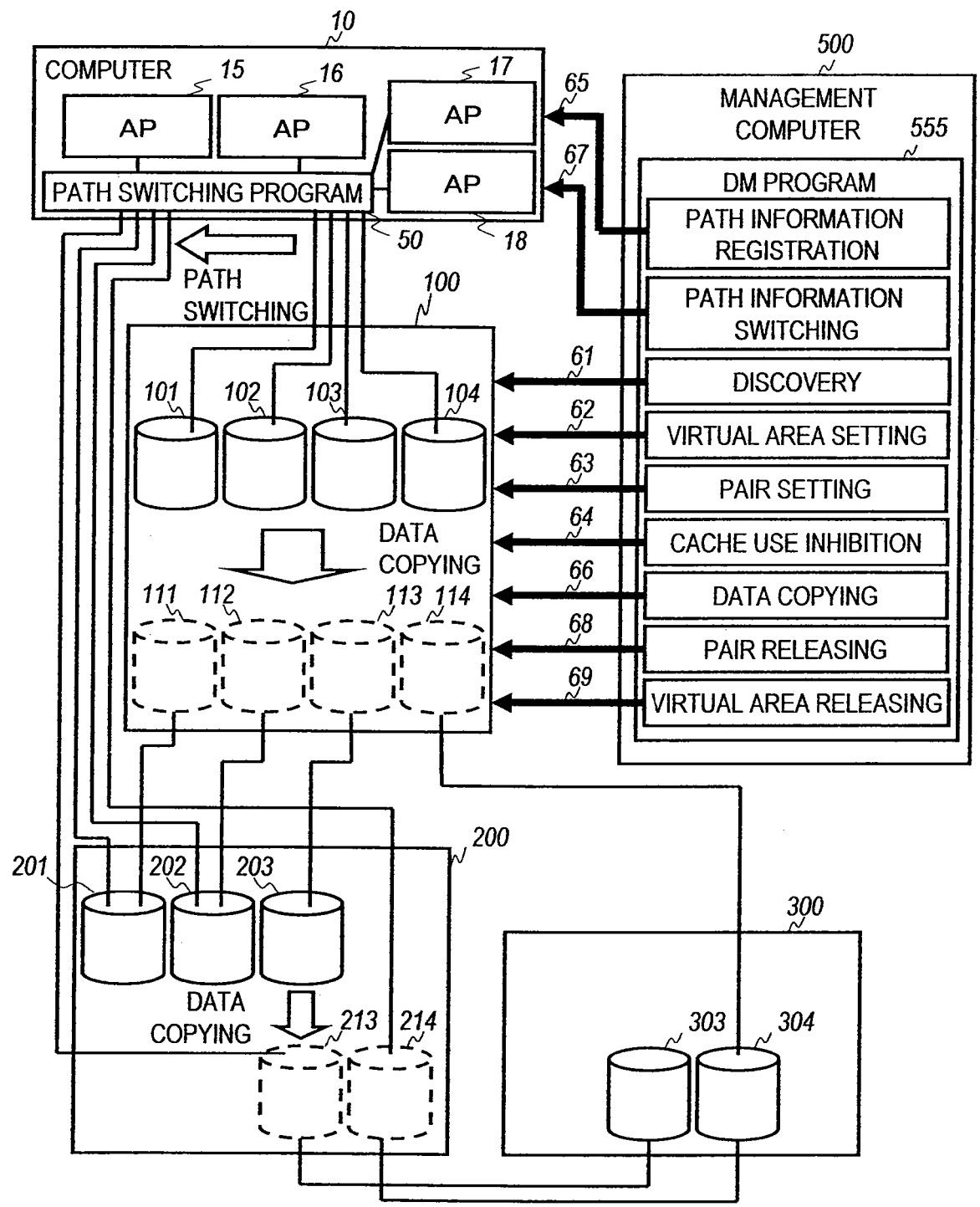
FIG. 1D is an explanatory diagram of an outline of the first embodiment.

FIGS. 1B to 1D show modified examples of the embodiment shown in FIG. 1A. Description of portions similar to those of FIG. 1A will be omitted below.

In an example of FIG. 1B, the storage system 100 is connected to the computer 10 and the storage system 200 via an FC switch. The storage system 200 is connected to the computer 10 and the storage system 300 via an FC switch. The storage system 300 is connected to the storage system 200 via the FC switch.

In the example of FIG. 1B, storage areas 201 and 202 are created in a storage system 200. As a result, a storage system 100 discovers the storage areas 201 and 202 (61).

Virtual storage areas 111 and 112 are related with the storage areas 201 and 202 (62), respectively. The storage areas 201 and 202 are registered as second paths in path information 51 (65).

Data of storage areas 101 and 102 are copied in the virtual storage areas 111 and 112 to be stored in the storage areas 201 and 202 (66). After path switching (67), application programs 15 and 16 issue read/write requests to the storage areas 201 and 202.

Subsequently, for example, when a use frequency of the storage area 202 drops below a predetermined threshold value, a DM program 555 instructs a storage system 300 to create a storage area 301. Additionally, the DM program 555 instructs the storage system 200 to create a virtual storage area 212 corresponding to the storage area 301, and to copy data of the storage area 202 in the virtual storage area 212. As a result, the data of the storage area 202 is stored in a storage area 302. Subsequently, the application program 15 issues a read/write request to the virtual storage area 212 to access the data of the storage area 302.

In the example of FIG. 1B, the use frequency of the storage area 202 of the upper storage system 200 is evaluated to decide whether to migrate the data of the storage area 202 to the storage system 300. Generally, however, as in the case of FIG. 1A, a value of the data stored in the storage area 202 or the like may be evaluated to decide whether to migrate the data. Specifically, when the value of the data is less than a predetermined threshold value, migration of the data to the lower storage system 300 may be decided. As in the case of FIG. 1A, the value of the data may be a data access pattern. This holds true in description below.

In an example of FIG. 1C, the storage system 100 is connected to the computer 10 and the storage systems 200 and 300 via an FC switch. The storage system 300 is connected to the storage systems 100 and 200 via an FC switch. The storage system 200 is connected to the computer 10 and the storage systems 100 and 300 via the FC switch.

In the example of FIG. 1C, a storage system 100 includes storage areas 101 to 104. Application programs 15, 16, 17, and 18 of a computer 10 respectively use the storage areas 101, 102, 103 and 104.

In this example, data stored in the storage area 101 is data necessary for operating a computer system. The data necessary for operating the computer system is data minimally required by a system operated by a customer. For example, in the case of a shopping system, customer data is data necessary for operating the computer system, while backup data is not.

For example, a management computer 500, the computer 10, the storage system 100, or the like may hold information (not shown) indicating whether data stored in the storage area 101 etc. is necessary or not for operating the computer system. Alternatively, the management computer 500, the computer 10, the storage system 100, or the like may hold information (not shown) indicating a kind of data stored in the storage area 101 or the like. Such information may be set by, e.g., a system administrator. A DM program 555 refers to the information to determine whether the data stored in the storage area 101 or the like is necessary or not for operating the computer system.

In the example of FIG. 1C, as the data of the storage area 101 is necessary for operating the computer system, the data is first migrated to a new upper storage system 200. Subsequently, data of the storage areas 102, 103, and 104 are migrated to a new lower storage system 300 while the system is operated.

First, the storage system 100 discovers a storage area 201 of the storage system 200 (61).

A virtual storage area 111 is related with the storage area 201 (62). The storage area 201 is registered as a second path in path information 51 (65).

Data of the storage area 101 is copied in the virtual storage area 111 to be stored in the storage area 201 (66).

Upon completion of the copying, the DM program 555 instructs a path switching program 50 of the computer 10 to switch paths. The path switching program 50 sets path information 51, and switches paths so that a request from an application program 15 can be issued to the storage area 201 (67). In other words, a path set between the computer 10 and the storage area 101 is released. Then, a new path is set between the computer 10 and the storage area 201.

After the path switching, the application program 15 issues a read/write request to the storage area 201. In other words, after the path switching, the computer 10 can continue the operation of the system by accessing the storage area 201 where the data necessary for operating the system has been stored. Then, data of another storage area such as the storage area 102 is migrated while the system is operated. Next, a procedure of data migration of the storage area 102 or the like will be described.

The storage system 100 discovers storage areas 302, 303, and 304 of the storage system 300 (61).

Virtual storage areas 112, 113, and 114 are related with the storage areas 302, 303, and 304, respectively (62). Further, in the storage system 200, virtual storage areas 212, 213, and 214 are created corresponding to the storage areas 302, 303, and 304. In the path information 51, virtual storage areas 212, 213, and 214 are registered as second paths (65).

Data of the storage areas 102, 103, and 104 are copied in the virtual storage areas 112, 113, and 114 to be stored in the storage areas 302, 303, and 304, respectively (66). After path switching (67), application programs 16, 17 and 18 can respectively access the storage areas 302, 303, and 304 by issuing read/write requests to the virtual storage areas 212, 213, and 214.

Subsequently, for example, when a use frequency of the storage area 302 exceeds a predetermined threshold value, a storage area 202 is created in the storage system 200, and data of the virtual storage area 212 is copied in the storage area 202. As a result, data of the storage area 302 is stored in the storage area 202. Then, the application program 16 issues a read/write request to the storage area 202.

In an example of FIG. 1D, the storage system 100 is connected to the computer 10 and the storage systems 200 and 300 via an FC switch. The storage system 200 is connected to the computer 10 and the storage systems 100 and 300 via an FC switch. The storage system 300 is connected to the storage systems 100 and 200 via the FC switch.

In the example of FIG. 1D, as the data stored in the storage area 104 is necessary for operating the computer system, the data of the storage area 104 is first migrated to a new lower storage system 300. Subsequently, data of the storage areas 101, 102, and 103 are migrated to a new upper storage system 200 while the system is operated.

First, the storage system 100 discovers a storage area 304 of the storage system 300 (61).

A virtual storage area 114 is related with the storage area 304 (62). Further, in the storage system 200, a virtual storage area 214 is created corresponding to the storage area 304. In path information 51, the virtual storage area 214 is registered as a second path (65).

The data of the storage area 104 is copied in the virtual storage area 114 to be stored in the storage area 304 (66). After path switching (67), an application program 18 can access the storage area 304 by issuing a read/write request to the virtual storage area 214.

Next, the storage system 100 discovers storage areas 201, 202, and 203 of the storage system 200 (61).

Virtual storage areas 111, 112 and 113 are related with the storage areas 201, 202, and 203 (62). In the path information 51, storage areas 201, 202, and 203 are registered as second paths (65).

Data of the storage areas 101, 102, and 103 are copied in the virtual storage areas 111, 112, and 113 to be stored in the storage areas 201, 202, and 203 (66). After path switching (67), application programs 16 to 18 can respectively issue read/write requests to the storage areas 201, 202, and 203.

Subsequently, for example, when a use frequency of the storage area 203 drops below a predetermined threshold value, a storage area 303 is created in the storage system 300. Additionally, a virtual storage area 213 corresponding to the storage area 303 is created in the storage system 200. Data of the storage area 203 is copied in the virtual storage area 213. As a result, the data of the storage area 203 is stored in the storage area 303. Then, an application program 17 can access the storage area 303 by issuing a read/write request to the virtual storage area 213.

Next, the hardware configuration of the computer system of the embodiment will be described.

FIG. 2A is a block diagram showing an example of the hardware configuration and the procedure of data migration of the computer system according to the first embodiment.

Description of the portions shown in FIGS. 1A to 1D will be omitted.

The computer 10 and the storage system 100 are connected by a fibre channel. More specifically, a fibre channel interface (FC interface) 13 of the computer 10 is connected to an FC interface 110 of the storage system 100 via a fibre channel switch (FC switch) 20. Further, the FC interface 13 is connected to an FC interface 210 of the storage system 200 via an FC switch 30.

On the other hand, the storage systems 100 and 200 are connected to each other by the fibre channel via the FC switch 30. In a similar manner, the storage systems 200 and 300 are connected to each other by the fibre channel via the FC switch 30. The FC switches 20 and 30 according to this embodiment compose a network which interconnects the computer 10, the storage system 100, and the like.

This invention is not limited by kinds of the network, and therefore, a network using the Internet protocol may be used, for example, instead of the fibre channel.

Next, explanations will be given to the computer 10.

The computer 10 includes a CPU 11, a memory 12, an FC interface 13, and a management interface 19.

The CPU 11 is a processor for executing the program stored in the memory 12.

The memory 12 stores a program, which is executed by the CPU 11, and data. The memory 12 of FIG. 2A stores an application program 15, a path switching program 50, and a path information 51. The memory 12 may further store an application program 16, 17 and 18 (see FIGS. 1A to 1D).

The application program 15 and the like execute data processing by issuing data read write requests to storage systems.

The path switching program 50 decides which storage area of which storage system the application program 15 and the like issue the read write request to.

The path information 51 is a table for setting the target storage area of the read write command issued by the application program 15 and the like (see FIG. 3A and the like).

The FC interface 13 is connected to the storage systems 100 and 200 via the FC switches 20 and 30. The computer 10 exchanges read write requests and data with each storage system via the FC interface 13.

The management interface 19 is connected to the management computer 500 via the management network 90.

Next, explanations will be given to a storage system 100.

The storage system 100 of FIG. 2A includes FC interfaces 110 and 115, a data transfer module 120, a cache 121, a CPU 140, a memory 150, a management interface 190, a storage area 101, and a virtual storage area 111. The storage system 100 may further include the storage area 102, the storage area 103, the storage area 104, the virtual storage area 112, the virtual storage area 113, and the virtual storage area 114 (see FIGS. 1A to 1D).

The FC interface 110 is connected to the computer 10 via the FC switch 20.

The FC interface 115 is connected to other storage systems (in the example of FIG. 2A, the storage system 200 or 300) via the FC switch 30.

The data transfer module 120 manages the data transfer between the storage area 101 etc. and the virtual storage area 111 etc., and the FC interface 110 and the like.

The cache 121 temporarily stores the data received from the computer 10 and the data read from the storage area 101 and the like.

The CPU (processor) 140 executes the program stored in the memory 150 to perform the processing of the request received from the computer 10, data copy, and the management of the storage area 101 and the like.

In the memory 150, programs executed by the CPU 140 and tables necessary for executing those programs are stored. Specifically, the memory 150 stores a storage area processing program 151, a virtual storage area processing program 152, a data copy control program 153, a cache management program 154, and a management table 155. Those programs are executed for processing the control of read write requests received form the computer 10 or the control of the storage area 101 and the like instructed by the management computer 500 (described later).

The management table 155 is used for managing the data copy executed in the storage system 100.

The management interface 190 is connected to the management computer 500 via the management network 90.

The storage area 101 is an area for storing the data used by the computer 10. For example, the storage system 100 includes one or more hard disk drives (not shown), on which the storage area 101 may be set. The computer 10 recognizes a single storage area 101 as a single logical device.

The computer system of FIG. 2A initially includes a single storage system 100 having a single storage area 101 and the like used by the computer 10. However, this invention can also be applicable to a computer system in which any number of computers use any number of storage areas.

Since the configurations of the storage systems 200 and 300 are similar to that of the storage system 100, detailed explanations will be omitted.

FC interfaces 210 and 215, a data transfer module 220, a cache 221, a CPU 240, a memory 250, and a management interface 290 of the storage system 200 are similar to the FC interfaces 110 and 115, the data transfer module 120, the cache 121, the CPU 140, the memory 150, and the management interface 190, respectively.

The storage system 200 of FIG. 2A includes a storage area 201 and a virtual storage area 211. The storage system 200 may further include storage areas 202 to 204 and virtual storage areas 212 to 214 shown in FIGS. 1A to 1D.

The memory 250 stores a management table 255. This is a table similar to the management table 155 (described later). As in the case of the memory 150, the memory 250 further stores a storage area processing program, a virtual storage area processing program, a data copy control program, and a cache management program (not shown).

An FC interface 310, an FC interface 315, a data transfer module 320, a cache 321, a CPU 340, a memory 350, and a management interface 390 of the storage system 300 are respectively similar to the FC interface 110, the FC interface 115, the data transfer module 120, the cache 121, the CPU 140, the memory 150, and the management interface 190. However, a memory 350 does not need to store a virtual storage area processing program, a data copy control program, a management table or the like unlike the case of the memory 150.

The storage system 300 of FIG. 2A includes a storage area 301. The storage area 300 may further include storage areas 302, 303 and 304 shown in FIGS. 1A to 1D.

Next, explanations will be given to the management computer 500.

The management computer 500 includes a CPU 510, a memory 550, and a management interface 590.

The CPU (processor) 510 executes the program stored in the memory 550.

The memory 550 stores programs executed by the CPU 510 and tables required for executing those programs. Specifically, the memory 550 stores a storage system detecting program 551, a data migration program (DM program) 555, and a management table 556.

The management table 556 is used for managing the data migration performed in the storage system 100 or the like (see FIG. 6A and the like).

Moreover, the management computer 500 is connected to a display 580 for presenting an administrator with necessary information, a keyboard 581 and a mouse 582 for accepting the input from the administrator.

Next, an example of a procedure of data migration will be described by referring to FIG. 2A.

Referring to FIG. 2A, the storage area 301 is a data migration destination of the storage area 101. The virtual storage area 111 corresponds to the storage area 301. When data copying is executed from the storage area 101 to the virtual storage area 111, the data of the storage area 101 is stored in the storage area 301 via the FC interface 115, the FC switch 30, and the FC interface 315 (or FC interface 310).

Specifically, a read request is issued to the storage area 101, and data are sequentially read. Next, for the read data, a write request is issued to the virtual storage area 111. In this case, the virtual storage area processing program 152 converts the write request to the virtual storage area 111 into a write request to the storage area 301 corresponding to the virtual storage area 111. The write request to the storage area 301 is issued from the FC interface of the storage system 100 to the storage system 300 through the FC switch 30, the FC interface 315, and the like. As a result, the data read from the storage area 101 migrates to the storage area 301 to be stored.

Data migration from the storage areas 101 and 102 to the storage areas 301 and 302 shown in FIG. 1A, data migration from the storage areas 102, 103, and 104 to the storage areas 302, 303, and 304 shown in FIG. 1C, and data migration from the storage area 104 to the storage area 304 shown in FIG. 1D are executed by the same procedure as that of the foregoing.

Upon an end of the data migration, a relation between the virtual storage area 111 and the storage area 301 is released. Then, the virtual storage area 211 and the storage area 301 are newly related with each other. Thereafter, the computer 10 can access the data of the storage area 301 by issuing a read/write request to the virtual storage area 211 via the FC interface 13, the FC switch 30, and the FC interface 210.

Specifically, for example, when the computer 10 issues a read request to the virtual storage area 211, the read request is converted into a read request to the storage area 301 by the virtual storage area processing program. Then, the converted read request is issued to the storage system 300. The virtual storage area processing program converts a response from the storage system 300 into a response to the computer 10. The converted response is transmitted to the computer 10. Similarly, a write request to the virtual storage area 211 is converted into a write request to the storage area 301.

The read/write request issued from the computer 10 to the virtual storage area 211, 212, 213, or 214 shown in FIGS. 1A to 1D is processed by the same process as that of the foregoing.

Subsequently, for example, when a use frequency of the storage area 301 exceeds a predetermined threshold value, data copying from the virtual storage area 211 to the storage area 201 is executed. As a result, the data of the storage area 301 is stored in the storage area 201 via the FC interface 315, the FC switch 30, and the FC interface 215.

Specifically, a read request is issued to the virtual storage area 211 to sequentially read data. In this case, the virtual storage area processing program converts the read request to the virtual storage area 211 into a read request to the storage area 301 corresponding to the virtual storage area 211. The read request to the storage area 301 is issued to the storage system 300. Next, for the read data, a write request is issued to the storage area 201. As a result, the data read from the storage area 301 migrates to the storage area 201 to be stored.

Data migration from the storage area 301 to the storage area 201 shown in FIG. 1A, and data migration from the storage area 302 to the storage area 202 shown in FIG. 1C are executed by the same procedure as that of the foregoing.

Upon an end of the data migration, a relation between the virtual storage area 211 and the storage area 201 is released. Thereafter, the computer 10 can issue a read/write request to the storage area 201 via the FC interface 13, the FC switch 30, and the FC interface 210.

Figure 2B:
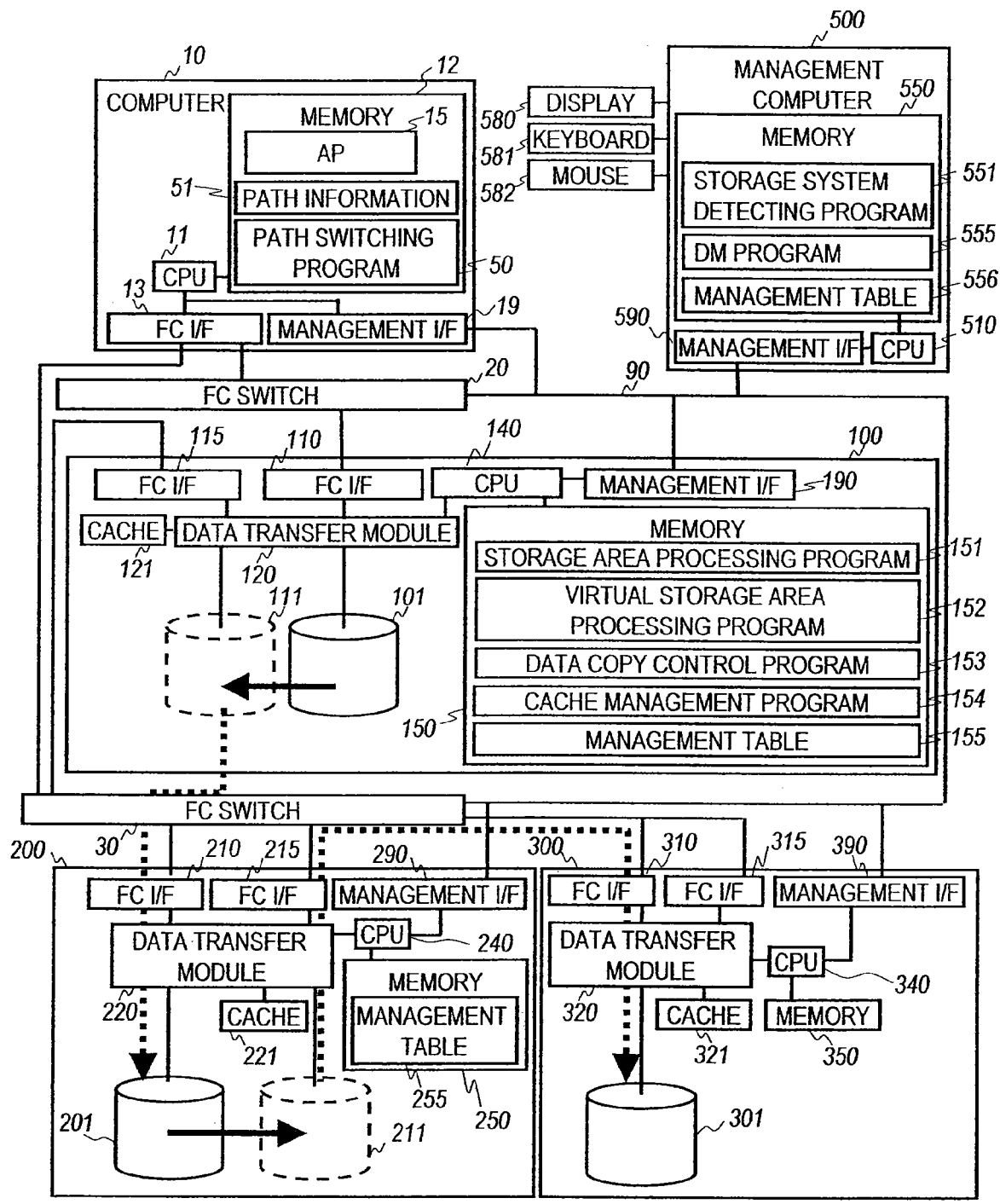
FIG. 2B is a block diagram illustrating another example of the procedure for data migration according to the first embodiment.

FIG. 2B is a block diagram showing another example of a procedure of data migration according to the first embodiment.

A hardware configuration of FIG. 2B is similar to that of FIG. 2A, and thus description thereof will be omitted. Detailed description of portions of the data migration procedure similar to those of FIG. 2A will be omitted.

In FIG. 2B, the storage area 201 is a data migration destination of the storage area 101. The virtual storage area 111 corresponds to the storage area 201. When data copying from the storage area 101 to the virtual storage area 111 is executed, the data of the storage area 101 is stored in the storage area 201 via the FC interface 115, the FC switch 30, and the FC interface 215.

Data migration from the storage areas 101 and 102 to the storage areas 201 and 202 shown in FIG. 1B, data migration from the storage area 101 to the storage area 201 shown in FIG. 1C, and data migration from the storage areas 101, 102, and 103 to the storage areas 201, 202, and 203 shown in FIG. 1D are executed by the same procedure as that of the foregoing.

Upon an end of the data migration, a relation between the virtual storage area 111 and the storage area 201 is released. Thereafter, the computer 10 can issue a read/write request to the storage area 201 via the FC interface 13, the FC switch 30, and the FC interface 210.

Subsequently, for example, when a use frequency of the storage area 201 drops below a predetermined threshold value, the virtual storage area 211 and the storage area 301 are related with each other to execute data copying from the storage area 201 to the virtual storage area 211. As a result, the data of the storage area 201 is stored in the storage area 301 via the FC interface 215, the FC switch 30, and the FC interface 315.

Data migration from the storage area 202 to the storage area 302 shown in FIG. 1B, and data migration from the storage area 203 to the storage area 303 shown in FIG. 1D are executed by the same procedure as that of the foregoing.

Thereafter, the computer 10 can access the data of the storage area 301 by issuing a read/write request to the virtual storage area 211 via the FC interface 13, the FC switch 30, and the FC interface 210.

In FIGS. 1A to 2B, data migration from the storage system 100 to the storage systems 200 and 300 is executed by data copying which uses the virtual storage areas. However, the data migration may be executed by other methods (e.g., remote copying).

Next, explanations will be given to the path information 51.

FIGS. 3A to 3L are each an explanatory diagram of the path information 51 according to the first embodiment of this invention.

First, FIGS. 3A to 3C are described. FIGS. 3A to 3C show the path information 51 of FIG. 1A at each time point.

The path information 51 according to this embodiment includes an application program number 511 and a connection destination storage area number 512.

The application program number 511 is a number of an application program whose read write command target is set based on the path information 51. In the example of FIG. 3A, the read write command target of each of the application programs 15 and 16 is set.

The connection destination storage area number 512 is a number (identifier) of a storage area of a connection destination of a path to be set. The connection destination storage area number 512 includes a connection destination storage area number of a first path, a connection destination storage area number of a second path. Likewise, the connection destination storage area number 512 includes connection destination storage area numbers up to an n-th path (n is a natural number). In this case, the first path indicates a path set at the present moment, and the second path indicates a path to be set next as a first path. Similarly, the n-th path is a path to be set next as an (n−1)th path.

In the description below, numbers (101 and the like) added to storage areas shown in the drawings are storage area numbers. For example, a storage area number of the storage area 101 is "101", and a storage area number of the virtual storage area 111 is "111".

Referring to FIG. 3A, "101" and "102" are registered as connection destination storage area numbers 512 of a first path corresponding to application programs 15 and 16. In this case, path connection destinations set for the application programs 15 and 16 are respectively storage areas 101 and 102. That is, at a point of this time, the application programs 15 and 16 respectively issue read/write requests to the storage areas 101 and 102.

On the other hand, "211" and "212" are registered as connection destination storage area numbers 512 of a second path corresponding to the application programs 15 and 16. These are registered in the step 65 of FIG. 1A. This means that path connection destinations to be set next for the application programs 15 and 16 are respectively virtual storage areas 211 and 212. In other words, when the DM program 555 instructs the path switching program 50 to execute path switching (the step 67 of FIG. 1A), the path switching program 50 registers contents registered as the connection destination storage area numbers 512 of the second path in the connection destination storage area numbers 512 of the first path, as shown in FIG. 3B.

As a result, the path connection destination for the application program 15 is switched from the storage area 101 to the virtual storage area 211. The path connection destination for the application program 16 is switched from the storage area 102 to the virtual storage area 212.

FIG. 3B shows path information 51 after the path switching in the step 67 of FIG. 1A.

Referring to FIG. 3B, the virtual storage areas 211 and 212 set as the second paths in FIG. 3A are set as first paths. In this case, the application programs 15 and 16 respectively issue read/write requests to the virtual storage areas 211 and 212. Further, in FIG. 3B, "201" is registered as a connection destination storage area number 512 of the second path corresponding to the application program 15. This registration is performed when the use frequency of the storage area 301 exceeds the predetermined threshold value, and it is decided that the data of the storage area 301 is to be migrated to the storage area 201 in FIG. 1A.

FIG. 3C shows path information 51 after the data migration from the storage area 301 to the storage area 201 is ended and the path is switched.

Referring to FIG. 3C, "201" is registered as a connection destination storage area number 512 of the first path corresponding to the application program 15. In this case, the application program 15 issues a read/write request to the storage area 201. On the other hand, a connection destination storage area number 512 of the first path corresponding to the application program 16 is "212" as in the case of FIG. 3B.

Next, FIGS. 3D to 3F will be described. FIGS. 3D to 3F show pieces of path information 51 at the respective points of time in FIG. 1B. Hereinafter, description of portions similar to those of FIGS. 3A to 3C will be omitted.

Referring to FIG. 3D, "101" and "102" are registered as connection destination storage area numbers 512 of a first path corresponding to application programs 15 and 16.

On the other hand, "201" and "202" are registered as connection destination storage area numbers 512 of a second path corresponding to the application programs 15 and 16. These are registered in the step 65 of FIG. 1B. This means that path connection destinations to be set next for the application programs 15 and 16 are respectively storage areas 201 and 202. In other words, in the step 67 of FIG. 1B, the path connection destination for the application program 15 is switched from the storage area 101 to the storage area 201. The path connection destination for the application program 16 is switched from the storage area 102 to the storage area 202.

FIG. 3E shows path information 51 after the path switching in the step 67 of FIG. 1B.

Referring to FIG. 3E, the storage areas 201 and 202 set as the second paths in FIG. 3D are set as first paths. In this case, the application programs 15 and 16 respectively issue read/write requests to the storage areas 201 and 202. Further, in FIG. 3E, "212" is registered as a connection destination storage area number 512 of the second path corresponding to the application program 16. This registration is performed when the use frequency of the storage area 202 falls below the predetermined threshold value, and it is decided that the data of the storage area 202 is to be migrated to the storage area 302 in FIG. 1B.

FIG. 3F shows path information 51 after the data migration from the storage area 202 to the storage area 302 is ended and the path is switched. As shown in FIG. 1B, the data migration from the storage area 202 to the storage area 302 is executed by copying the data from the storage area 202 to the virtual storage area 212 corresponding to the storage area 302.

Referring to FIG. 3F, "212" is registered as a connection destination storage area number 512 of the first path corresponding to the application program 16. In this case, the application program 16 issues a read/write request to the virtual storage area 212 corresponding to the storage area 302. On the other hand, a connection destination storage area number 512 of the first path corresponding to the application program 15 is "201" as in the case of FIG. 3E.

Next, FIGS. 3G to 3I will be described. FIGS. 3G to 3I show pieces of path information 51 at the respective points of time in FIG. 1C.

Referring to FIG. 3G, "101", "102", "103", and "104" are respectively registered as connection destination storage area numbers 512 of the first path corresponding to the application programs 15, 16, 17, and 18. At this point of time, the application programs 15, 16, 17, and 18 respectively issue read/write requests to the storage areas 101, 102, 103, and 104.

On the other hand, "201", "212", "213", and "214" are registered as connection destination storage area numbers 512 of the second path corresponding to the application programs 15, 16, 17, and 18. These are registered in the step 65 of FIG. 1C. This means that path connection destinations to be set next for the application programs 15, 16, 17, and 18 are respectively a storage area 201, and virtual storage areas 212, 213, and 214.

FIG. 3H shows path information after the path switching in the step 67 of FIG. 1C.

Referring to FIG. 3H, the storage area 201 and the virtual storage areas 212, 213, and 214 set as the second paths in FIG. 3G are set as first paths. In this case, the application programs 15, 16, 17, and 18 respectively issue read/write requests to the storage area 201 and the virtual storage areas 212, 213, and 214. Further, in FIG. 3H, "202" is registered as a connection destination storage area number 512 of the second path corresponding to the application program 16. This registration is performed when the use frequency of the storage area 302 exceeds the predetermined threshold value, and it is decided that the data of the storage area 302 is to be migrated to the storage area 202 in FIG. 1C.

FIG. 3I shows path information 51 after the data migration from the storage area 302 to the storage area 202 is ended and path is switched.

Referring to FIG. 3I, "202" is registered as a connection destination storage area number 512 of the first path corresponding to the application program 16. In this case, the application program 16 issues a read/write request to the storage area 202. On the other hand, connection destination storage area numbers 512 of the first path corresponding to the application programs 15, 17, and 18 are respectively "201", "213", and "214" as in the case of FIG. 3H.

Next, FIGS. 3J to 3L will be described. FIGS. 3J to 3L show pieces of path information 51 at the respective points of time in FIG. 1D.

Referring to FIG. 3J, "101", "102", "103", and "104" are respectively registered as connection destination storage area numbers 512 of the first path corresponding to the application programs 15, 16, 17, and 18.

On the other hand, "201", "202", "203", and "214" are registered as connection destination storage area numbers 512 of the second path corresponding to the application programs 15, 16, 17, and 18. These are registered in the step 65 of FIG. 1D. This means that path connection destinations to be set next for the application programs 15, 16, 17, and 18 are respectively a storage areas 201, 202, and 203 and virtual storage area 214.

FIG. 3K shows path information after the path switching in the step 67 of FIG. 1D.

Referring to FIG. 3K, the storage areas 201, 202, and 203 and the virtual storage area 214 set as the second paths in FIG. 3J are set as first paths. In this case, the application programs 15, 16, 17, and 18 respectively issue read/write requests to the storage areas 201, 202, and 203 and the virtual storage area 214. Further, in FIG. 3K, "213" is registered as a connection destination storage area number 512 of the second path corresponding to the application program 17. This registration is performed when the use frequency of the storage area 203 falls below the predetermined threshold value, and it is decided that the data of the storage area 203 is to be migrated to the storage area 303 in FIG. 1D.

FIG. 3L shows path information 51 after data migration from the storage area 203 to the storage area 303 is ended and path is switched. As shown in FIG. 1D, the data migration from the storage area 203 to the storage area 303 is executed by copying the data from the storage area 203 to the virtual storage area 213 corresponding to the storage area 303.

Referring to FIG. 3L, "213" is registered as a connection destination storage area number 512 of the first path corresponding to the application program 17. In this case, the application program 17 issues a read/write request to the virtual storage area 213 corresponding to the storage area 303. On the other hand, a connection destination storage area numbers 512 of the first path corresponding to the application programs 15, 16, and 18 are respectively "201", "202" and "214" as in the case of FIG. 3K.

Next, explanations will be given to a storage area list.

FIGS. 4A and 4B are an explanatory diagram of the storage area list according to the first embodiment of this invention.

The storage area list is created when the storage area processing program 151 of the storage system 100, the storage area processing program of the storage system 200 (not shown), or the storage area processing program of the storage system 300 (not shown) receives the request from the management computer 500, and includes information to be returned to the management computer 500 (described later).

The storage area list includes information with regard to the storage area 101 and the like, which is set in the storage system 100 and the like at the time of creation. The storage area list according to this embodiment includes a storage area number 1561 and a capacity 1562.

FIG. 4A shows an example of the storage area list to which the storage area processing program 151 of the storage system 100 of FIG. 1A or 1B responds. In the example of FIG. 4A, as the storage area number 1561, "101" and "102" are registered. Further, as the capacity 1562 related to each storage area number 1561, "100 GB" is registered. This represents that the storage areas 101 and 102 are set in the storage system 100, and the storage capacity of each of those is 100 GB (gigabytes).

FIG. 4B shows an example of a list of storage areas to which the storage area processing program 151 of the storage system 100 of FIG. 1C or 1D responds. In the example of FIG. 4B, "101", "102", "103", and "104" are registered as storage area numbers 1561. Additionally, "100 GB" is registered as a capacity 1562 corresponding to each storage area number 1561. This means that the storage areas 101, 102, 103, and 104 are set in the storage system 100, and capacities thereof are 100 GB.

Next, the management table 556 will be described.

Each of FIGS. 5A to 5P is an explanatory diagram of a management table 556 stored in the management computer 500 of the first embodiment.

First, FIGS. 5A to 5D will be described. FIGS. 5A to 5D show management tables 556 at the respective points of time in FIG. 1A.

The management table 556 is a table for managing data migration executed in the computer system of this embodiment. The management table 556 includes a data migration source storage area number 5561, a virtual storage area number 5562, and a data migration destination storage area number 5563. In those fields, storage area numbers (identifiers) are registered for identifying any one of storage areas and virtual storage areas.

In the example of FIG. 5A, as the data migration source storage area number 5561, "101" and "102" are registered, and as the data migration destination storage area number 5563 corresponding to "101" and "102", "301" and "302" are registered. This represents that data in the storage areas 101 and 102 are set to be migrated to the storage areas 301 and 302, respectively.

In the example of FIG. 5B, as the data migration source storage area number 5561, "101" and "102" are registered, as the virtual storage area number 5562, "111" and "112" are registered corresponding to "101" and "102", and as the data migration destination storage area number 5563, "301" and "302" are registered corresponding to "111" and "112". This represents that the virtual storage areas 111 and 112 corresponding to the storage areas 301 and 302 are set, data in the storage areas 101 and 102 are copied to the virtual storage areas 111 and 112 respectively, and therefore the data is migrated to the storage areas 301 and 302.

Referring to FIG. 5C, "301" is registered as a data migration source storage area number 5561, and "201" is registered as a corresponding data migration destination storage area number 5563. This means that data of the storage area 301 is set to migrate to the storage area 201.

Referring to FIG. 5D, "301" is registered as a data migration source storage area number 5561, "211" is set as a corresponding virtual storage area number 5562, and "201" is registered as a corresponding data migration destination storage area number 5563. This means that the virtual storage area 211 is set corresponding to the storage area 301, and data of the virtual storage area 211 is copied in the storage area 201, whereby data of the storage area 301 migrates to the storage area 201.

Next, FIGS. 5E to 5H will be described. FIGS. 5E to 5H show management tables 556 at the respective points of time in FIG. 1B. Hereinafter, description of portions similar to those of FIGS. 5A to 5D will be omitted.

Referring to FIG. 5E, "101" and "102" are registered as data migration source storage area numbers 5561, and "201" and "202" are registered as corresponding data migration destination storage area numbers 5563. This means that data of the storage areas 101 and 102 are set to migrate to the storage areas 201 and 202.

In FIG. 5F, as the data migration source storage area number 5561, "101" and "102" are registered, as the virtual storage area number 5562, "111" and "112" are registered corresponding to "101" and "102", and as the data migration destination storage area number 5563, "201" and "202" are registered corresponding to "111" and "112". This represents that the virtual storage areas 111 and 112 corresponding to the storage areas 201 and 202 are set, data in the storage areas 101 and 102 are copied to the virtual storage areas 111 and 112 respectively, and therefore the data is migrated to the storage areas 201 and 202.

Referring to FIG. 5G, "202" is registered as a data migration source storage area number 5561, and "302" is registered as a corresponding data migration destination storage area number 5563. This means that data of the storage area 202 is set to migrate to the storage area 302.

Referring to FIG. 5H, "202" is registered as a data migration source storage area number 5561, "212" is set as a corresponding virtual storage area number 5562, and "302" is registered as a corresponding data migration destination storage area number 5563. This means that the virtual storage area 212 is set corresponding to the storage area 302, and data of the storage area 202 is copied in the virtual storage area 212, whereby data of the storage area 202 migrates to the storage area 302.

Next, FIGS. 5I to 5L will be described. FIGS. 5I to 5L show management tables 556 at the respective points of time in FIG. 1C.

Referring to FIG. 5I, "101", "102", "103" and "104" are registered as data migration source storage area numbers 5561, and "201", "302", "303" and "304" are registered as corresponding data migration destination storage area numbers 5563. This means that data of the storage areas 101, 102, 103, and 104 are set to migrate respectively to the storage areas 201, 302, 303 and 304.

Referring to FIG. 5J, "101", "102", "103", and "104" are registered as data migration source storage area numbers 5561, "111", "112", "113", and "114" are registered as corresponding virtual storage area numbers 5562, and "201", "302", "303", and "304" are registered as corresponding data migration destination storage area numbers 5563. This means that the virtual storage areas 111, 112, 113, and 114 are set corresponding to the storage areas 201, 302, 303, and 304, and data of the storage areas 101, 102, 103, and 104 are respectively copied in the virtual storage areas 111, 112, 113, and 114, whereby the data migrate to the storage areas 201, 302, 303, and 304.

Referring to FIG. 5K, "302" is registered as a data migration source storage area number 5561, and "202" is registered as a corresponding data migration destination storage area number 5563. This means that data of the storage area 302 is set to migrate to the storage area 202.

Referring to FIG. 5L, "302" is registered as a data migration source storage area number 5561, "212" is set as a corresponding virtual storage area number 5562, and "202" is registered as a corresponding data migration destination storage area number 5563. This means that the virtual storage area 212 is set corresponding to the storage area 302, and data of the virtual storage area 212 is copied in the storage area 202, whereby data of the storage area 302 migrates to the storage area 202.

Next, FIGS. 5M to 5P will be described. FIGS. 5M to 5P show management tables 556 at the respective points of time in FIG. 1D.

Referring to FIG. 5M, "101", "102", "103" and "104" are registered as data migration source storage area numbers 5561, and "201", "202", "203" and "304" are registered as corresponding data migration destination storage area numbers 5563. This means that data of the storage areas 101, 102, 103, and 104 are set to migrate respectively to the storage areas 201, 202, 203, and 304.

Referring to FIG. 5N, "101", "102", "103", and "104" are registered as data migration source storage area numbers 5561, "111", "112", "113", and "114" are registered as corresponding virtual storage area numbers 5562, and "201", "202", "203", and "304" are registered as corresponding data migration destination storage area numbers 5563. This means that the virtual storage areas 111, 112, 113, and 114 are set corresponding to the storage areas 201, 202, 203, and 304, and data of the storage areas 101, 102, 103, and 104 are respectively copied in the virtual storage areas 111, 112, 113, and 114, whereby the data of the storage areas 101, 102, 103, and 104 migrates to the storage areas 201, 202, 203, and 304.

Referring to FIG. 5O, "203" is registered as a data migration source storage area number 5561, and "303" is registered as a corresponding data migration destination storage area number 5563. This means that data of the storage area 203 is set to migrate to the storage area 303.

Referring to FIG. 5P, "203" is registered as a data migration source storage area number 5561, "213" is set as a corresponding virtual storage area number 5562, and "303" is registered as a corresponding data migration destination storage area number 5563. This means that the virtual storage area 213 is set corresponding to the storage area 303, and data of the storage area 203 is copied in the virtual storage area 213, whereby data of the storage area 203 migrates to the storage area 303.

Next, explanations will be given to the management table 155.

FIGS. 6A to 6P are each an explanatory diagram of the management table 155 stored in the storage system 100 and the management table 255 stored in the storage system 200 according to the first embodiment.

First, FIGS. 6A and 6B will be described. These show management tables 155 at the respective points of time in FIG. 1A.

The management table 155 etc., are tables for managing pair status of storage areas in the storage systems 100 etc.

The management tables 155 and 255 include a copy source storage area number 1551, a copy destination storage area number 1552, and a status 1553.

In the copy source storage area numbers 1551 and the copy destination storage area number 1552, numbers (identifiers) of the storage area (or virtual storage area) of a source and a destination of data copy to be performed, respectively, are registered.

Referring to FIG. 6A, "101" and "102" are registered as copy source storage area numbers 1551. Additionally, "111" and "112" are registered as corresponding copy destination storage area numbers 1552. This means that the storage areas 101 and 102 respectively form pairs with the virtual storage areas 111 and 112. In these pairs, the storage areas 101 and 102 are copy sources, and the virtual storage areas 111 and 112 are copy destinations.

A status 1553 indicates a status of the pair. Referring to FIG. 6A, "PAIR" is registered as a status 1553 for all the pairs. This means that the copy destination storage area stores the same data as that of the copy source storage area of the pair to which it belongs. When data of the copy source and the copy destination are different from each other, the data of the copy source is copied to the copy destination. As a result, the same data as that of the copy source storage area is stored in the copy destination storage area. In the case of FIG. 6A, the same data as that of the storage area 101 is stored in the virtual storage area 111 (i.e., storage area 301), and the same data as that of the storage area 102 is stored in the virtual storage area 112 (i.e., storage area 302).

Referring to FIG. 6B, a copy source storage area number 1551 and a copy destination storage area number 1552 are identical to those of FIG. 6A. On the other hand, "BEING COPIED" is registered as a status 1553 for all the pairs. This means that data is being copied from the copy source storage area to the copy destination storage area. In the case of FIG. 6B, data are being copied from the storage areas 101 and 102 to the virtual storage areas 111 and 112.

Next, FIGS. 6C and 6D will be described. These show management tables 255 at the respective points of time in FIG. 1A. Hereinafter, description of portions similar to those of FIGS. 6A and 6B will be omitted.

In FIGS. 6C and 6D, "211" is registered as a copy source storage area number 1551, and "201" is registered as a copy destination storage area number 1552. This means that the virtual storage area 211 forms a pair with the storage area 201. In this pair, the virtual storage area 211 is a copy source, and the storage area 201 is a copy destination.

Referring to FIG. 6C, "PAIR" is registered as a status 1553. In this case, the same data as that of the virtual storage area 211 (i.e., storage area 301) is stored in the storage area 201.

On the other hand, referring to FIG. 6D, "BEING COPIED" is registered as a status 1553. In this case, data is being copied from the virtual storage area 211 to the storage area 201.

FIGS. 6E and 6F show management tables 155 at the respective points of time in FIG. 1B. These are similar to those of FIGS. 6A and 6B, and thus description thereof will be omitted. However, in FIGS. 6E and 6F, the virtual storage areas 111 and 112 correspond to the storage areas 201 and 202 shown in FIG. 2B.

Next, FIGS. 6G and 6H will be described. These show management tables 255 at the respective points of time in FIG. 1B.

In FIGS. 6G and 6H, "202" is registered as a copy source storage area number 1551, and "212" is registered as a copy destination storage area number 1552. This means that the storage area 202 forms a pair with the virtual storage area 212.

In this pair, the storage area 202 is a copy source, and the virtual storage area 212 is a copy destination.

Referring to FIG. 6G, "PAIR" is registered as a status 1553. In this case, the same data as that of the storage area 202 is stored in virtual the storage area 212 (i.e., storage area 302).

On the other hand, referring to FIG. 6H, "BEING COPIED" is registered as a status 1553. In this case, data is being copied from the storage area 202 to the virtual storage area 212.

Next, FIGS. 6I and 6J will be described. These show management tables 155 at the respective points of time in FIG. 1C.

In FIGS. 6I and 6J, "101", "102", "103", and "104" are registered as copy source storage area numbers 1551, and "111", "112", "113", and "114" are registered as corresponding copy destination storage areas 1552. This means that the storage areas 101, 102, 103, and 104 respectively form pairs with the virtual storage areas 111, 112, 113, and 114. In these pairs, the storage areas 101, 102, 103, and 104 are copy sources, and the virtual storage areas 111, 112, 113, and 114 are copy destinations.

Referring to FIG. 6I, "PAIR" is registered as a status 1553 for all the pairs. In this case, the same data as that of the copy source storage area is stored in the copy destination storage area. For example, the same data as that of the storage area 101 is stored in the virtual storage area 111 (i.e., storage area 201).

On the other hand, referring to FIG. 6J, "BEING COPIED" is registered as a status 1553 for all the pairs. In this case, data are being copied from the storage areas 101, 102, 103, and 104 to the virtual storage areas 111, 112, 113, and 114.

Next, FIGS. 6K and 6L will be described. These show management tables 255 at the respective points of time in FIG. 1C.

In FIGS. 6K and 6L, "212" is registered as a copy source storage area number 1551, and "202" is registered as a copy destination storage area number 1552. This means that the virtual storage area 212 forms a pair with the storage area 202. In this pair, the virtual storage area 212 is a copy source, and the storage area 202 is a copy destination.

Referring to FIG. 6K, "PAIR" is registered as a status 1553. In this case, the same data as that of the virtual storage area 212 (i.e., storage area 302) is stored in the storage area 202.

On the other hand, referring to FIG. 6L, "BEING COPIED" is registered as a status 1553. In this case, data is being copied from the virtual storage area 212 to the storage area 202.

FIGS. 6M and 6N show management tables 155 at the respective points of time in FIG. 1D. These are similar to those of FIGS. 6I and 6J, and thus description thereof will be omitted.

Next, FIGS. 6O and 6P will be described. These show management tables 255 at the respective points of time in FIG. 1D.

In FIGS. 6O and 6P, "203" is registered as a copy source storage area number 1551, and "213" is registered as a copy destination storage area number 1552. This means that the storage area 203 forms a pair with the virtual storage area 213. In this pair, the storage area 203 is a copy source, and the virtual storage area 213 is a copy destination.

Referring to FIG. 6O, "PAIR" is registered as a status 1553. In this case, the same data as that of the storage area 203 is stored in the virtual storage area 213 (i.e., storage area 303).

On the other hand, referring to FIG. 6P, "BEING COPIED" is registered as a status 1553. In this case, data is being copied from the storage area 203 to the virtual storage area 213.

Next, a checking screen will be described.

Figure 7A:
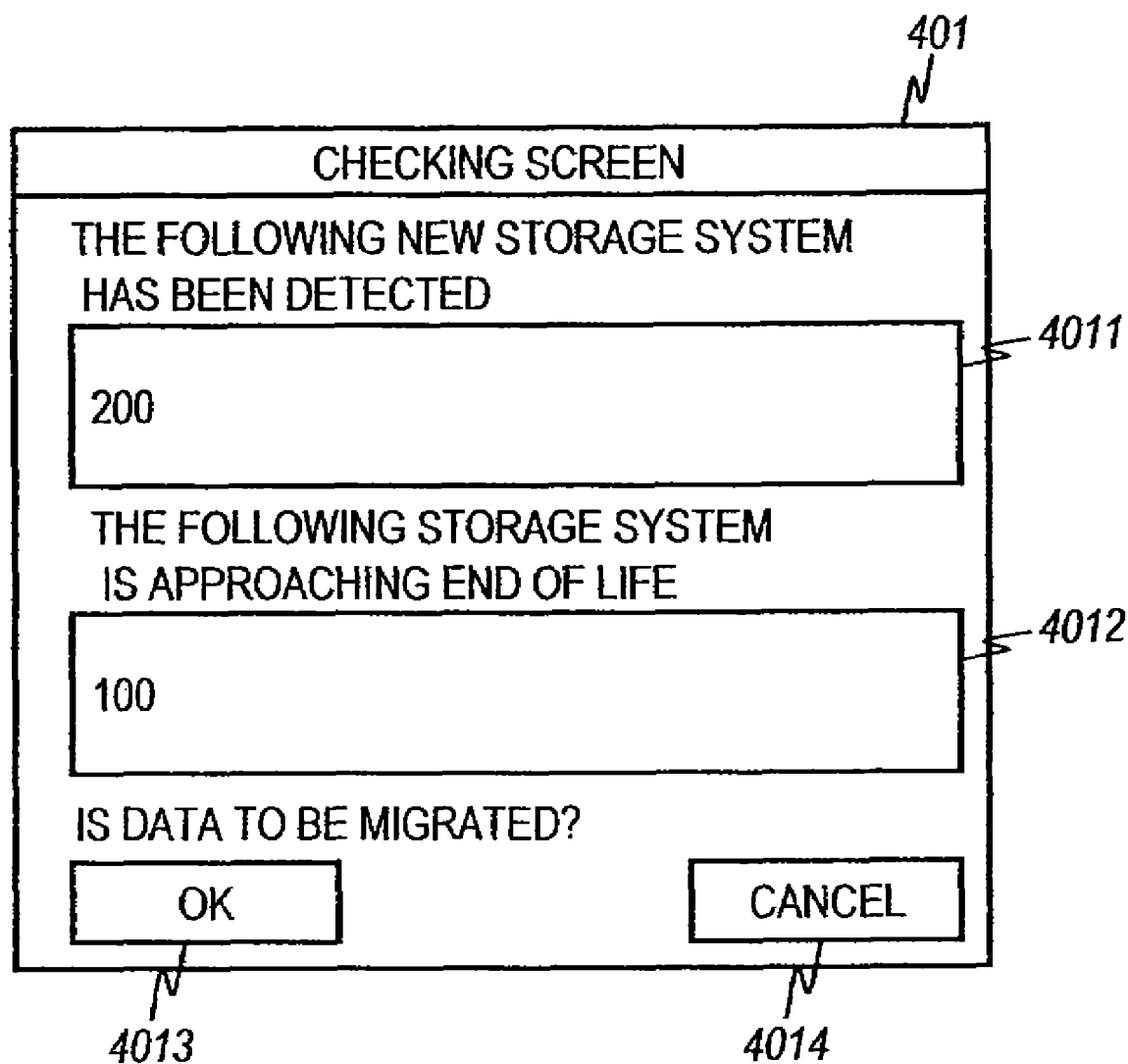
FIG. 7A is an explanatory diagram of a checking screen displayed on a display according to the first embodiment.
Figure 7B:
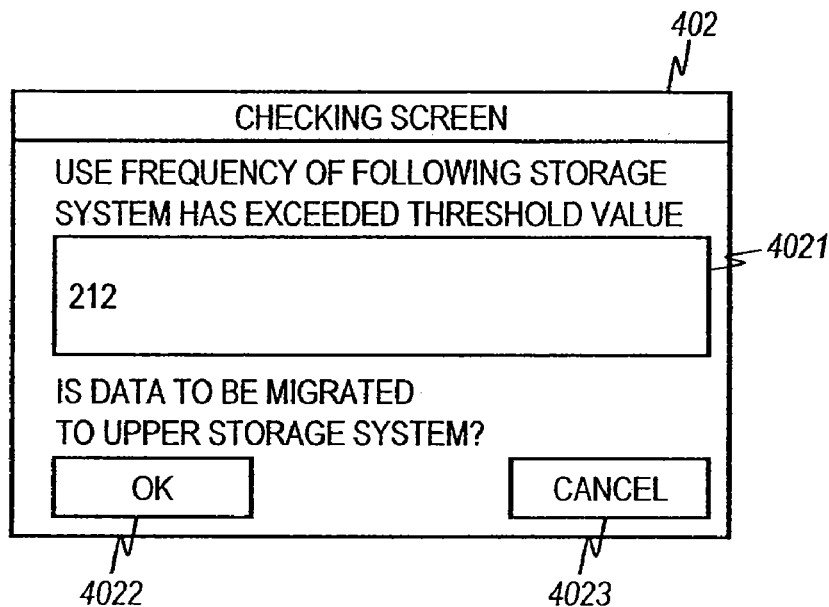
FIG. 7B is an explanatory diagram of a checking screen displayed on the display according to the first embodiment.
Figure 7C:
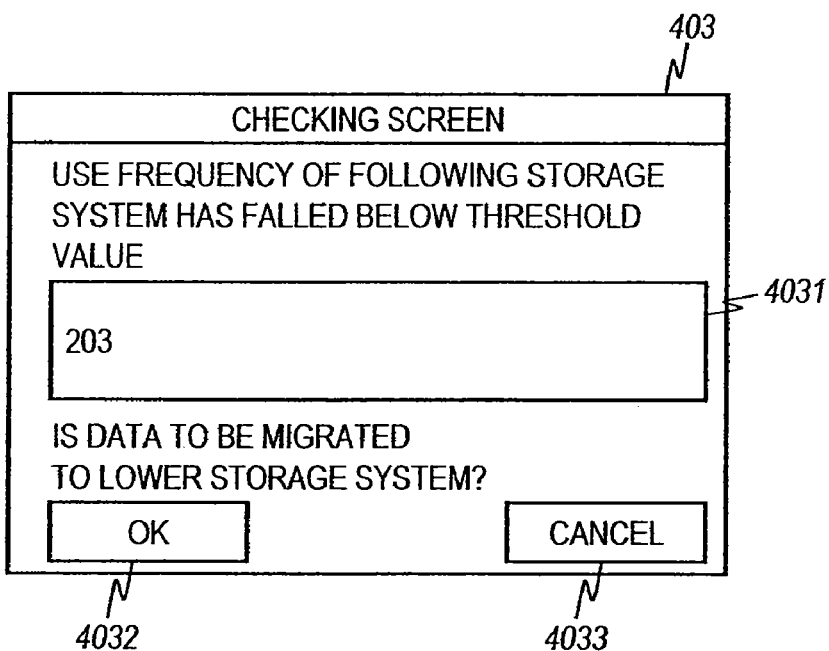
FIG. 7C is an explanatory diagram of a checking screen displayed on the display according to the first embodiment.

Each of FIGS. 7A to 7C is an explanatory diagram of a checking screen displayed on the display 580 of the first embodiment.

A checking screen 401 shown in FIG. 7A is displayed on the display 580 when the storage system 100 approaches its end of life, a new storage system 200 or the like is added, and the management computer 500 discovers the added storage system 200 or the like.

The checking screen 401 includes a new storage system display field 4011, an old storage system display field 4012, an execution button 4013, and a cancel button 4014.

In the new storage system display field 4011, information indicating a new storage system discovered according to a discovery instruction (61) is displayed.

On the other hand, in the old storage system display field 4012, information indicating an old storage system approaching its end of life is displayed.

In the example of FIG. 7A, "200" is displayed in the new storage system display field 4011, and "100" is displayed in the old storage system display field 4012. This means that while the storage system 100 approaches its end of life, the new storage system 200 is connected to the computer system and discovered by the discovery instruction.

The execution button 4013 ("OK" in FIG. 7A) is operated (e.g., mouse 582 is clicked) when the system administrator executes data migration. In the example of FIG. 7A, when the system administrator operates the execution button 4013, the DM program 555 starts data migration from the storage system 100 to the storage system 200 or the like as described later.

The cancel button 4014 ("CANCEL" of FIG. 7A) is operated when the system administrator does not execute data migration. When the system administrator operates the cancel button 4014, the DM program 555 does not start data migration.

A checking screen 402 shown in FIG. 7B is displayed on the display 580 when a use frequency of any storage areas exceeds a predetermined threshold value.

The checking screen 402 includes a storage area display field 4021, an execution button 4022, and a cancel button 4023.

In the storage area display field 4021, a storage area number of a storage area whose use frequency exceeds a predetermined threshold value is displayed. FIG. 7B shows an example of a checking screen 402 when the use frequency of the virtual storage area 212 (i.e., use frequency of the storage area 302) exceeds the predetermined threshold value in FIG. 1C. Accordingly, "212" is displayed in the storage area display field 4021.

The execution button 4022 is operated when the system administrator migrates data of the storage area displayed in the storage area display field 4021 to the upper storage system 200. In the example of FIG. 7B, when the system administrator operates the execution button 4022, processing of migrating data of the virtual storage area 212 (in reality, data of the storage area 302 of the lower storage system 300) to the storage area 202 of the upper storage system 200 is started as shown in FIG. 1C.

The cancel button 4023 is operated when the system administrator does not execute data migration. In FIG. 7B, when the system administrator operates the cancel button 4023, the data of the virtual storage area 212 (i.e., the data of the storage area 302) is not migrated.

A checking screen 403 shown in FIG. 7C is displayed on the display 580 when a use frequency of any storage areas falls below a predetermined threshold value.

The checking screen 403 includes a storage area display field 4031, an execution button 4032, and a cancel button 4033.

In the storage area display field 4031, a storage area number of a storage area whose use frequency falls below a predetermined threshold value is displayed. FIG. 7C shows an example of a checking screen 403 when the use frequency of the virtual storage area 203 falls below the predetermined threshold value in FIG. 1D. Accordingly, "203" is displayed in the storage area display field 4031.

The execution button 4032 is operated when the system administrator migrates data of the storage area displayed in the storage area display field 4031 to the lower storage system 300. In the example of FIG. 7C, when the system administrator operates the execution button 4032, processing of migrating data of the storage area 203 to the storage area 303 of the lower storage system 300 is started as shown in FIG. 1C. The data of the storage area 203 is copied to the virtual storage area 213 corresponding to the storage area 303.

The cancel button 4033 is operated when the system administrator does not execute data migration. In FIG. 7C, when the system administrator operates the cancel button 4033, the data of the storage area 203 is not migrated.

Each of FIGS. 7B and 7C shows the example of starting the data migration when the system administrator operates the execution button 4022 or the like. However, the DM program 555 may monitor a use frequency to determine whether to execute data migration, and automatically execute data migration when the execution is determined. Processing executed by the DM program 555 in this case will be described below.

Figure 8A:
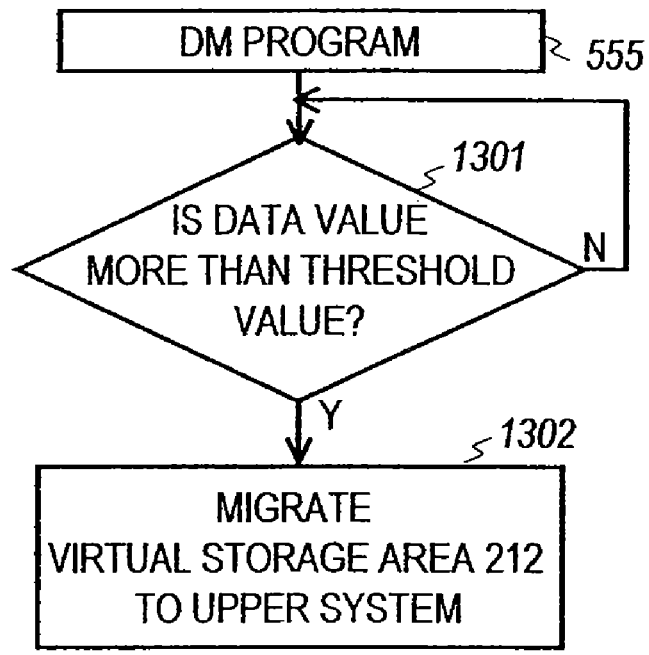
FIG. 8A is a flowchart of a process where a DM program determines whether to execute data migration according to the first embodiment.
Figure 8B:
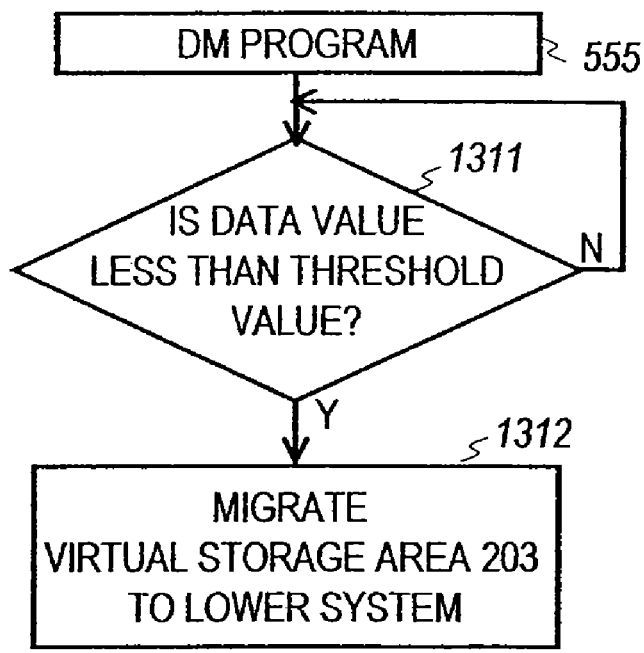
FIG. 8B is a flowchart of a process where the DM program determines whether to execute data migration according to the first embodiment.
Figure 9:
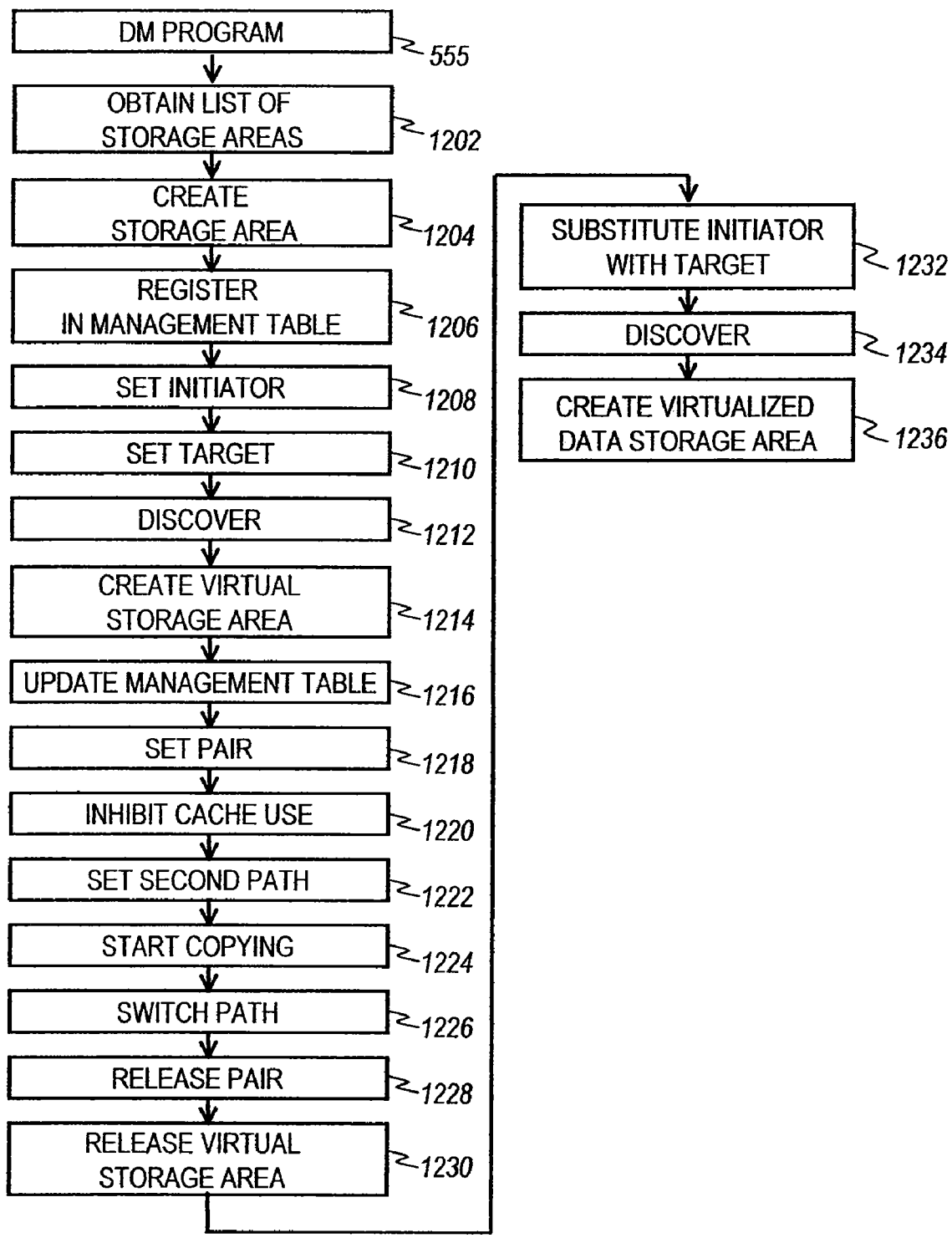
FIG. 9 is a flowchart showing a procedure of data migration executed by the DM program according to the first embodiment.

It should be noted that processing executed by the DM program in each step of flowcharts below shown in FIGS. 8A, 8B, and 9 is actually executed by the CPU 510 for executing the DM program 555.

Each of FIGS. 8A and 8B is a flowchart of processing where the DM program 555 determines whether to execute data migration according to the first embodiment.

FIG. 8A shows processing of determining whether to migrate the data of the virtual storage area 212 (in reality, data of the storage area 302 stored in the lower storage system 300) to the upper storage system 200 in the example of FIG. 1C.

The DM program 555 determines whether a value of the data of the virtual storage area 212 exceeds a predetermined threshold value or not (1301). As described above, according to the embodiment, a use frequency of the data is used as an index indicating a value of the data. As the index indicating the value of the data, other indexes such as a data access pattern may be used.

If it is determined in the step 1301 that the value (use frequency) of the data exceeds the predetermined threshold value, data of such a high value (e.g., data of a high use frequency) is preferably stored in the storage system 200 near the computer 10. Accordingly, the DM program 555 decides migration of the data of the virtual storage area 212 to the upper storage system 200 (1302).

In this case, the DM program 555 instructs the data copy control program (not shown) of the storage system 200 to copy the data of the virtual storage area 212 in a newly created storage area 202. Upon reception of this instruction, the data copy control program of the storage system 200 copies the data of the virtual storage area 212 in the storage area 202. As a result, the data of the storage area 302 corresponding to the virtual storage area 212 migrates to the storage area 202 to be stored.

Similarly, for the other virtual storage area 213 or the like in the upper storage system 200, the DM program 555 determines whether to execute data migration.

On the other hand, if it is determined in the step 1301 that the value of the data does not exceed the predetermined threshold value, the process returns to the step 1301 to continuously monitor the use frequency.

FIG. 8B shows processing of determining whether to migrate the data of the storage area 203 to the lower storage system 300 in the example of FIG. 1D. Hereinafter, description of portions similar to those of FIG. 8A will be omitted.

The DM program 555 determines whether a value of the data of the storage area 203 is less than a predetermined threshold value or not (1311).

If it is determined In the step 1311 that the value (use frequency) of the data is less than the predetermined value, such data of a low value (e.g., data of a low use frequency) is preferably stored in the lower storage system 300 far from the computer 10. As a result, data of a high value can be stored by the upper storage system. Thus, the DM program 555 decides migration of the data of the storage area 203 to the lower storage system 300 (1312). In the example of FIG. 1D, the data of the storage area 203 is copied in the virtual storage area 213. As a result, the data of the storage area 203 migrates to the storage area 303 corresponding to the virtual storage area 213 to be stored.

On the other hand, if it is determined in the step 1311 that the value of the data is not less than the predetermined threshold value, the process returns to the step 1311 to continuously monitor the use frequency.

The DM program 555 determines whether to migrate data similarly for the other storage area 201 or the like in the upper storage system 200.

Next, the data migration of the embodiment will be described.

First, referring to FIG. 2A, explanations will be given to the initial condition.

The computer system according to this embodiment initially includes the computer 10, the FC switch 20, the storage system 100, and the management computer 500. The application program 15 of the computer 10 utilizes the storage area 101 of the storage system 100. The path information 51 sets the storage area number "101" of the connection destination as the first path shown in FIG. 3A etc. The path switching program 50 refers to the path information 51 whenever receiving a read/write request from the application program 15, and issues a read/write request to the storage area 101 of the connection destination. As a result, the application program 15 issues the read/write request to the storage area 101 via the FC interface 13.

Next, installation of the new storage system 200 or the like will be described.

It is now assumed that the storage system 100 approaches its end of life and data is migrated to the new storage system 200 or 300. The system administrator installs the storage systems 200 and 300, and an FC switch 30. Then, the system administrator connects the FC interfaces 115, 210, 215, 310, and 315 to the switch 30. Further, the system administrator connects the management interfaces 290 and 390 to the management network 90.

Next, detection of the storage system 200 or the like in the management computer 500 will be described.

The storage system detecting program 551 of the management computer 500 periodically navigates through the management network 90 to check residual operation time of the connected storage system (i.e., time until end of device life) and connection of a new storage system. According to the embodiment, when the new storage system 200 is detected, for example, the storage system detecting program 551 displays the checking screen 401 shown in FIG. 4A on the display 580. As a result, the addition of the new storage system 200 and the approaching of the storage system 100 to its end of life are notified to the system administrator.

When the storage system 300 is discovered, it is similarly notified to the system administrator by the checking screen 401.

As described above, the system administrator can decide whether to execute data migration by referring to the checking screen 401 to operate the keyboard 581 or the mouse 582. A case where the execution button 4013 is operated on the checking screen 401 (i.e., system administrator decides execution of data migration) will be described below with reference to a flowchart of FIG. 9.

FIG. 9 is a flowchart showing a procedure of data migration executed by the DM program 555 according to the first embodiment.

When the execution button 4013 is operated on the checking screen 401, the management computer 500 executes the DM program 555.

Now, as an example, the procedure of migrating the data of the storage area 101 in FIG. 1A will be described with reference to FIGS. 1A and 2A and other drawings. In the example of FIG. 1A, the data of the storage area 102 is similarly migrated to the storage area 302. However, description thereof will be omitted.

The DM program 555 first obtains the storage area list from the storage system 100 (1202). In this embodiment, the DM program 555 requires the storage area list to the storage area processing program 151 of the storage system 100. The storage area processing program 151 responds to the request with the storage area list shown in FIG. 4A.

Next, the DM program 555 gives the storage system 300 an instruction to create a storage area, which corresponds to the storage capacity of the storage area 101, as the destination of data migration of the storage area 101 (1204). As shown in the storage area list of FIG. 4A, the storage capacity of the storage area 101 is "100 GB". Therefore, the DM program 555 gives the storage area processing program (not shown) of the storage system 200 an instruction to create a storage area of 100 GB. The storage area processing program creates the storage area 301 of 100 GB. Then, the storage area processing program notifies the DM program 555 that the storage area 301 has been created.

Next, the DM program 555 registers in the management table 556 that the storage area 301 corresponding to the storage area 101 has been created (1206). FIG. 5A shows the content of the management table 556 at this time.

Next, the DM program 555 sets the FC interface 115 of the storage system 100 as an initiator (1208). As a result, the storage system 100 becomes ready to issue read write request via the FC interface 115 to the storage system 300.

Then, the DM program 555 sets the FC interface 310 of the storage system 300 as a target (1210). As a result, the storage system 300 becomes ready to receive read write request via the FC interface 310 from the storage system 100.

Next, the DM program 555 gives the virtual storage area processing program 152 an instruction to discover the storage area via the FC interface 115, which is set as the initiator (1212). Herein, the storage area 301 is discovered. The virtual storage area processing program 152 notifies the DM program 555 that the storage area 301 has been discovered.

Then, the DM program 555 gives the virtual storage area processing program 152 an instruction to create a virtual storage area corresponding to the storage area 301 (1214).

The virtual storage area processing program 152 creates the virtual storage area 111. The virtual storage area processing program 152 notifies the DM program 555 that the virtual storage area 111 corresponding to the storage area 301 has been created.

Further, in the step 1214, the DM program 555 instructs the virtual storage area processing program (not shown) of the storage system 200 to create a virtual storage area corresponding to the storage area 301. The virtual storage area processing program creates a virtual storage area 211 and notifies it to the DM program 555.

Next, The DM program 555 updates the management table 556 (1216). Specifically, the DM program 555 registers the virtual storage area 111 corresponding to the storage area 301 in the management table 556. FIG. 5B shows the updated content of the management table 556.

The read/write request (including the request issued at the time of data copy operation) to the virtual storage area 111 is issued via the FC interface 115, which is set as the initiator, to the storage area 301 of the storage system 300. In other words, the read/write request to the virtual storage area 111 is actually converted into the read/write request to the storage area 301 and reissued. As a result, in response to the write request to the virtual storage area 111, data is written into the storage area 301, and in response to the read request to the virtual storage area 111, data is read out from the storage area 301.

Next, the DM program 555 gives the data copy control program 153 an instruction to configure a pair, in which the storage area 101 is the source of data copy and the virtual storage area 111 is the destination of data copy (1218). With the pair configuration, data copy becomes ready for execution. The data copy control program 153 registers the pair configuration in the management table 155. Moreover, the data copy control program 153 manages the status of the configured pair by utilizing the management table 155. FIG. 6A shows the content of the management table 155 immediately after the execution of the step 1218.

Then, the DM program 555 gives the cache management program 154 an instruction to inhibit the use of the cache 121 regarding the storage area 101 (1220). The cache management program 154 writes all the remaining data in the cache 121 regarding the storage area 101 into the storage area 101. After that, when a data write request to the storage area 101 exists, the data is not written in the cache 121.

When paths are switched after completion of the copying, data of the copy source and destination storage areas must match each other. However, if the cache 121 contains data received from the computer, and the data has not been written in the storage area 101, the data of the storage areas 101 and 301 do not completely match each other. Thus, in a step 820, use of the cache 121 is inhibited. The inhibition of the use of the cache 121 makes longer response time to the computer. Accordingly, after the completion of the copying, the use of the cache 121 may be inhibited immediately before path switching.

Then, the DM program 555 gives the path switching program 50 of the computer 10 an instruction to register the virtual storage area 211 as the second path related to the storage area 101 (1222). FIG. 3A shows the path information 51 at this time.

Next, the DM program 555 gives the data copy control program 153 an instruction to start copy operation (1224). The data copy control program 153 starts copy operation from the storage area 1001 to the virtual storage area 111. Then, as shown in FIG. 6B, the data copy control program 153 updates the status 1553 corresponding to the pair of the storage area 101 and the virtual storage area 111 in the management table 155 as "BEING COPIED".

The data copy means that the data transfer module 120 sequentially reads from the first block to the final block of the storage area (in this embodiment, the storage area 101), which is a source, and writes them into the block at the same position in the storage area (in this embodiment, the virtual storage area 111), which is a destination.

When receiving a data write request from the computer 10 during the data copy operation, the data transfer module 120 may write the data into both the storage area 101, which is a source, and the virtual storage area 111, which is a destination. Alternatively, the data transfer module 120 may write data only to the storage area 101, which is the source, memorizes the location of the block, where data is written, and after copying up to the final block, the memorized data on the location of the block can be copied again.

In this embodiment, the destination is the virtual storage area 111. Thus, when data is written into the virtual storage area 111 in the copy operation, the virtual storage area processing program converts the write request into a write request for the storage area 301 to issue the write request via the FC interface 115.

Upon the completion of the copy operation, the data copy control program 153 notifies the DM program 555 to that effect.

Next, the DM program 555 gives the path switching program 50 of the computer 10 an instruction to set the virtual storage area 211 as the first path for the path information 51 (1226). The path switch program 50 updates the path information 51 to the first path as shown in FIG. 3B. After the path information 51 is updated, the read write request issued by the application program 15 is issued by the path switching program 50 to the virtual storage area 211 corresponding to the new storage area 301, where data migration is completed. When the update of the path information 51 is completed, the path switching program 50 notifies the DM program 555 to that effect.

Next, the DM program 555 gives the data copy control program 153 an instruction to release the pair relation between the storage area 101 and the virtual storage area 111 (1228). Moreover, the DM program 555 gives the virtual storage area processing program 152 an instruction to release the correspondence between the storage area 301 and the virtual storage area 111 (1230).

After the completion of the above procedures, further, the DM program 555 may set the FC interface 310 as the initiator and the FC interface 115 as the target (1232).

Then, the DM program 555 may give the virtual storage area processing program (not shown) of the storage system 300 an instruction to discover a storage area via the FC interface 310, which is set as the initiator (1234). In the configuration of FIG. 1A, the storage area 101 is discovered.

Next, the DM program 555 may give the virtual storage area processing program of the storage system 300 an instruction to create a virtual storage area (not shown) corresponding to the storage area 101 (1236). As a result, the computer 10 can reuse the storage area 101 via the storage system 300. Thus, after the completion of data migration, even the storage system whose life is about to expire, can continue to be used almost until the end of device life, and therefore, the storage area can be effectively utilized. However, the use of such a storage area is desirably used temporarily.

The explanation of FIG. 9 has been made by taking the example where the data of the storage area 101 migrates to the storage area 301 in FIG. 1A. However, the other data migration of the embodiment can be executed by the procedure of FIG. 9.

Specifically, referring to FIG. 1A, when the data of the storage area 102 migrates to the storage area 302, the list of storage areas obtained in the step 1202 is as shown in FIG. 4A. The management table 556 registered in the step 1206 is as shown in FIG. 5A. The management table 556 registered in the step 1216 is as shown in FIG. 5B. The management table 155 registered in the step 1218 is as shown in FIG. 6A. The path information 51 registered in the step 1222 is as shown in FIG. 3A. The management table 155 updated in the step 1224 is as shown in FIG. 6B. The path information 51 updated in the step 1226 is as shown in the first path of FIG. 3B.

Further, when the data of the storage area 301 migrates to the storage area 201, the management table 556 registered in the step 1206 is as shown in FIG. 5C. The management table 556 registered in the step 1216 is as shown in FIG. 5D. The management table 155 registered in the step 1218 is as shown in FIG. 6C. The path information 51 registered in the step 1222 is as shown in the second path of FIG. 3B. The management table 155 updated in the step 1224 is as shown in FIG. 6D. The path information 51 updated in the step 1226 is as shown in FIG. 3C.

Referring to FIG. 11B, when the data of the storage areas 101 and 102 respectively migrate to the storage areas 201 and 202, the list of storage areas obtained in the step 1202 is as shown in FIG. 4A. The management table 556 registered in the step 1206 is as shown in FIG. 5E. The management table 556 registered in the step 1216 is as shown in FIG. 5F. The management table 155 registered in the step 1218 is as shown in FIG. 6E. The path information 51 registered in the step 1222 is as shown in FIG. 3D. The management table 155 updated in the step 1224 is as shown in FIG. 6F. The path information 51 updated in the step 1226 is as shown in the first path of FIG. 3E.

Further, when the data of the storage area 202 migrates to the storage area 302, the management table 556 registered in the step 1206 is as shown in FIG. 5G. The management table 556 registered in the step 1216 is as shown in FIG. 5H. The management table 155 registered in the step 1218 is as shown in FIG. 6G. The path information 51 registered in the step 1222 is as shown in the second path of FIG. 3E. The management table 155 updated in the step 1224 is as shown in FIG. 6H. The path information 51 updated in the step 1226 is as shown in FIG. 3F.

Referring to FIG. 1C, when the data of the storage area 101 migrates to the storage area 201 and the data of the storage areas 102, 103, and 104 respectively migrate to the storage areas 302, 303, and 304, the list of storage areas obtained in the step 1202 is as shown in FIG. 4B. The management table 556 registered in the step 1206 is as shown in FIG. 5I. The management table 556 registered in the step 1216 is as shown in FIG. 5J. The management table 155 registered in the step 1218 is as shown in FIG. 6I. The path information 51 registered in the step 1222 is as shown in FIG. 3G. The management table 155 updated in the step 1224 is as shown in FIG. 6J. The path information 51 updated in the step 1226 is as shown in the first path of FIG. 3H.

Further, when the data of the storage area 302 migrates to the storage area 202, the management table 556 registered in the step 1206 is as shown in FIG. 5K. The management table 556 registered in the step 1216 is as shown in FIG. 5L. The management table 155 registered in the step 1218 is as shown in FIG. 6K. The path information 51 registered in the step 1222 is as shown in the second path of FIG. 3H. The management table 155 updated in the step 1224 is as shown in FIG. 6L. The path information updated in the step 1226 is as shown in FIG. 3I.

Referring to FIG. 1D, when the data of the storage areas 101, 102, and 103 respectively migrate to the storage areas 201, 202, and 203, and the data of the storage area 104 migrates to the storage area 304, the list of storage areas obtained in the step 1202 is as shown in FIG. 4B. The management table 556 registered in the step 1206 is as shown in FIG. 5M. The management table 556 registered in the step 1216 is as shown in FIG. 5N. The management table 155 registered in the step 1218 is as shown in FIG. 6M. The path information 51 registered in the step 1222 is as shown in FIG. 3J. The management table 155 updated in the step 1224 is as shown in FIG. 6N. The path information 51 updated in the step 1226 is as shown in the first path of FIG. 3K.

Further, when the data of the storage area 203 migrates to the storage area 303, the management table 556 registered in the step 1206 is as shown in FIG. 5O. The management table 556 registered in the step 1216 is as shown in FIG. 5P. The management table 155 registered in the step 1218 is as shown in FIG. 6O. The path information 51 registered in the step 1222 is as shown in the second path of FIG. 3K. The management table 155 updated in the step 1224 is as shown in FIG. 6P. The path information 51 updated in the step 1226 is as shown in FIG. 3L.

According to the first embodiment, before migration of the data stored in the storage areas, it is not necessary to decide which of the upper and lower storage systems the data of all the storage areas are migrated to. In other words, after the data migration to one of the upper and lower storage systems, a decision can be made by referring to an index such as an access frequency. Thus, the data can be optimally arranged.

Furthermore, an I/O path for copying data and an application I/O path from the computer can be separated during data migration. Thus, it is possible to reduce application loads.

What is claimed is:

1. A method of migrating data in a computer system including a computer and a plurality of storage systems,
   the computer including an interface, a processor, and a memory,
   each of the plurality of storage systems including an interface, a processor, and a memory,
   the plurality of storage systems including a first storage system, a second storage system, and a third storage system,
   the method comprising:
   a first step of coupling the first storage system to the computer and the second storage system, the first storage system having a first storage area for storing data written by the computer;
   a second step of coupling the second storage system to the first storage system and the third storage system, the second storage system having a second storage area for storing data;
   a third step of coupling the third storage system to the computer and the second storage system, the third storage system having a virtual storage area corresponding to the second storage area;
   a fourth step of migrating data stored in the first storage area to the second storage area;
   a fifth step of converting an access request to the virtual storage area into an access request to the second storage area and issuing the converted access request to the second storage system; and
   a sixth step of migrating the data migrated to the second storage area to a third storage area created in the third storage system based on a determination result between a value of the data migrated to the second storage area and a predetermined threshold value.

2. The method of migrating data according to claim 1, wherein the sixth step includes a step of issuing a read access request to the second storage area, and a step of writing the data read from the second storage area in the third storage area.

3. The method of migrating data according to claim 1, wherein the value of the data is a number of access requests issued during a predetermined time period from the computer to the virtual storage area.

4. The method of migrating data according to claim 1, wherein:
   the value of the data is at least one of a number of write access requests issued during a predetermined time period from the computer to the virtual storage area, and a number of read access requests issued during a predetermined time period from the computer to the virtual storage area; and
   the threshold value is set for each of the number of write access requests issued during a predetermined time period and the number of read access requests issued during a predetermined time period.

5. The method of migrating data according to claim 1, wherein:
   the value of the data migrated to the second storage area is a use frequency of the second storage area;
   the sixth step includes a step of migrating the data migrated to the second storage area to the third storage area in the case where the use frequency exceeds the predetermined threshold value.

6. A method of migrating data in a computer system including a computer and a plurality of storage systems,
   the computer having an interface, a processor, and a memory;
   each of the plurality of storage systems having an interface, a processor, and a memory; and
   the plurality of storage systems having a first storage system, a second storage system, and a third storage system,
   the method comprising:
   a first step of coupling the first storage system to the computer and the second storage system, the first storage system including a first storage area for storing data written by the computer;
   a second step of coupling the second storage system to the computer, the first storage system, and the third storage system, the second storage system including a second storage area for storing data;
   a third step of coupling the third storage system to the second storage system;
   a fourth step of migrating data stored in the first storage area to the second storage area;
   a fifth step of migrating the data migrated to the second storage area to a third storage area created in the third storage system based on a determination result between a value of the data migrated to the second storage area and a predetermined threshold value.

7. The method of migrating data according to claim 6, wherein:
   the second storage system includes a virtual storage area corresponding to the third storage area;
   the method further comprises a sixth step of converting an access request to the virtual storage area into an access request to the third storage area and issuing the converted access request to the third storage system; and the fifth step includes a step of reading the data from the second storage area, and a step of issuing a write access request for writing the data read from the second storage area to the third storage area.

8. The method of migrating data according to claim 7, wherein the value of the data is a number of access requests issued during a predetermined time period from the computer to the virtual storage area.

9. The method of migrating data according to claim 6, wherein:
the value of the data is at least one of a number of write access requests issued during a predetermined time period from the computer to the virtual storage area, and a number of read access requests issued during a predetermined time period from the computer to the virtual storage area; and
the threshold value is set for each of the number of write access requests issued during a predetermined time period and the number of read access requests issued during a predetermined time period.

10. The method of migrating data according to claim 6, wherein:
the value of the data migrated to the second storage area is an use frequency of the second storage area; and
the sixth step includes a step of migrating the data migrated to the second storage area to the third storage area in the case where the use frequency does not exceed the predetermined threshold value.

11. A method of migrating data in a computer system including a computer and a plurality of storage systems,
the computer includes an interface, a processor, and a memory,
each of the plurality of storage systems includes an interface, a processor, and a memory,
the plurality of storage systems include a first storage system, a second storage system, and a third storage system,
the method comprising:
a first step of coupling the first storage system, which includes a plurality of first storage areas for storing data written by the computer, to the computer, the second storage system, and the third storage system;
a second step of coupling the second storage system, which includes one or more second storage areas for storing data, to the first storage system and the third storage system;
a third step of coupling the third storage system, which includes one or more third storage areas for storing data and one or more virtual storage areas corresponding to one or more second storage areas, to the computer, the first storage system and the second storage system;
a fourth step of migrating data stored in the one or more first storage areas to the one or more second storage areas;
a fifth step of migrating data stored in at least one of the first storage area and the second storage area to the one or more third storage areas;
a sixth step of converting an access request to each of the virtual storage areas into an access request to the second storage area corresponding to the virtual storage area, and issuing the converted access request to the second storage system;
a seventh step of migrating data from predetermined one or more first storage areas to one or more third storage areas;
a eighth step of setting an access path between the computer and one or more of the third storage areas upon end of the data migration; and
a ninth step of migrating data from one or more first storage areas other than the predetermined first storage areas to one or more second storage areas after the access path is set.

12. The method of migrating data according to claim 11, further comprising a tenth step of migrating the data migrated to the second storage area to the third storage area based on a determination result between a value of the data migrated to each second storage area and a predetermined threshold value.

13. The method of migrating data according to claim 12, wherein the tenth step includes a step of issuing a read access request to the second storage area, and a step of writing the data read from the second storage area in the third storage area.

14. The method of migrating data according to claim 12, wherein the value of the data is a number of access requests issued during a predetermined time period from the computer to the virtual storage area.

15. The method of migrating data according to claim 12, wherein:
the value of the data is at least one of a number of write access requests issued during a predetermined time period from the computer to the virtual storage area, and a number of read access requests issued during a predetermined time period from the computer to the virtual storage area; and
the threshold value is set for each of the number of write access requests issued during a predetermined time period and the number of read access requests issued during a predetermined time period.

16. The method of migrating data according to claim 11, wherein the predetermined one or more first storage areas store data necessary for operating the computer system.

17. A method of migrating data in a computer system including a computer and a plurality of storage systems,
the computer includes an interface, a processor, and a memory,
each of the plurality of storage systems includes an interface, a processor, and a memory,
the plurality of storage systems include a first storage system, a second storage system, and a third storage system,
the method comprising:
a first step of coupling the first storage system which includes a plurality of first storage areas to store data written by the computer to the computer, the second storage system, and the third storage system;
a second step of coupling the second storage system which includes one or more second storage areas for storing data and one or more virtual storage areas corresponding to one or more third storage areas to the computer, the first storage system and the third storage system;
a third step of coupling the third storage system which includes one or more third storage areas for storing data to the first storage system and the second storage system;
a fourth step of migrating data stored in the one or more first storage areas to the one or more second storage areas;
a fifth step of migrating data stored in at least one of the first storage area and the second storage area to the one or more third storage areas;

a sixth step of converting an access request to each of the virtual storage areas into an access request to the third storage area corresponding to the virtual storage area, and issuing the converted access request to the third storage system;

a seventh step of migrating data from predetermined one or more first storage areas to one or more third storage areas;

a eighth step of setting an access path between the computer and one or more of the virtual storage areas upon end of the data migration; and a ninth step of migrating data from one or more first storage areas other than the predetermined first storage areas to one or more second storage areas after the access path is set.

18. The method of migrating data according to claim 17, further comprising a tenth step of migrating the data migrated to the second storage area to the third storage area based on a determination result between a value of the data migrated to each second storage area and a predetermined threshold value.

19. The method of migrating data according to claim 18, wherein the tenth step includes a step of reading the data from the second storage area and a step of issuing a write access request for writing the data read from the second storage area to the third storage area.

20. The method of migrating data according to claim 18, wherein the value of the data is a number of access requests issued during a predetermined time period from the computer to the virtual storage area.

21. The method of migrating data according to claim 18, wherein:

the value of the data is at least one of a number of write access requests issued during a predetermined time period from the computer to the virtual storage area, and a number of read access requests issued during a predetermined time period from the computer to the virtual storage area; and the threshold value is set for each of the number of write access requests issued during a predetermined time period and the number of read access requests issued during a predetermined time period.

\* \* \* \* \*